United States Patent
Ahn et al.

(10) Patent No.: US 7,388,824 B2
(45) Date of Patent: *Jun. 17, 2008

(54) METHOD OF AND APPARATUS FOR RECORDING DATA ON OPTICAL RECORDING MEDIUM

(75) Inventors: Yong-jin Ahn, Seoul (KR); In-sik Park, Gyeonggi-do (KR); Kyung-geun Lee, Gyeonggi-do (KR); Chang-jin Yang, Gyeonggi-do (KR); Tatsuhiro Otsuka, Gyeonggi-do (KR); Du-seop Yoon, Gyeonggi-do (KR); Seong-sue Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/806,320

(22) Filed: Mar. 23, 2004

(65) Prior Publication Data

US 2004/0179453 A1 Sep. 16, 2004

Related U.S. Application Data

(63) Continuation of application No. 10/256,244, filed on Sep. 27, 2002.

(60) Provisional application No. 60/373,377, filed on Apr. 18, 2002, provisional application No. 60/327,305, filed on Oct. 9, 2001.

(30) Foreign Application Priority Data

Sep. 29, 2001 (KR) ............................... 2001-61039
Dec. 18, 2001 (KR) ............................... 2001-80541

(51) Int. Cl.
*G11B 7/00* (2006.01)

(52) U.S. Cl. .................................... 369/116; 369/59.11

(58) Field of Classification Search .................. 369/100
See application file for complete search history.

(56) References Cited

U.S. PATENT DOCUMENTS

| 5,007,039 | A | | 4/1991 | Sakemoto et al. |
| 5,109,373 | A | * | 4/1992 | Ohno et al. ................. 369/100 |
| 5,132,878 | A | | 7/1992 | Carey |
| 5,144,601 | A | | 9/1992 | Maeda et al. |
| 5,150,351 | A | * | 9/1992 | Ohno et al. ................. 369/116 |

(Continued)

FOREIGN PATENT DOCUMENTS

| CN | 1186297 | 7/1998 |
| EP | 0 309 200 | 3/1989 |
| EP | 0 335 486 | 10/1989 |
| EP | 1130583 | 9/2001 |
| JP | 1-165034 | 6/1989 |

(Continued)

OTHER PUBLICATIONS

Chinese Office Action issued Feb. 18, 2005.
Japanese Office Action issued May 17, 2005.
U.S. Appl. No. 10/256,244, filed Sep. 27, 2002, Yong-jin Ahn et al., Samsung Electronics Co., Ltd.

(Continued)

*Primary Examiner*—Wayne Young
*Assistant Examiner*—Lixi Chow
(74) *Attorney, Agent, or Firm*—Stein, McEwen & Bui, LLP

(57) ABSTRACT

A method of and apparatus for recording data on an optical recording medium form a mark or a space by using a recording waveform having an erase pattern containing a multi-pulse. The method and the apparatus prevent distortion of the mark or the space and improve a mark shape such that a recording/reproducing characteristic of the optical recording medium is improved.

21 Claims, 18 Drawing Sheets

U.S. PATENT DOCUMENTS

| | | | |
|---|---|---|---|
| 5,291,470 A | 3/1994 | Nishiuchi et al. | 369/100 |
| 5,353,265 A | 10/1994 | Maeda et al. | |
| 5,390,156 A | 2/1995 | Izumi et al. | |
| 5,412,626 A | 5/1995 | Ohno et al. | |
| 5,802,031 A | 9/1998 | Clark et al. | |
| 5,825,742 A | 10/1998 | Tanaka et al. | |
| 5,854,775 A | 12/1998 | Izumi et al. | |
| 6,088,315 A * | 7/2000 | Ando | 369/47.41 |
| 6,104,685 A | 8/2000 | Hideki et al. | 369/59 |
| 6,150,964 A | 11/2000 | McLaughlin | |
| 6,280,810 B1 | 8/2001 | Nakamura et al. | |
| 6,281,815 B1 | 8/2001 | Shim et al. | 341/59 |
| 6,396,792 B1 * | 5/2002 | Ichihara | 369/116 |
| 6,600,709 B2 * | 7/2003 | Dekker | 369/53.26 |
| 6,650,607 B1 | 11/2003 | Hidehiko | |
| 2002/0001275 A1 | 1/2002 | Tanaka et al. | |
| 2002/0003762 A1 | 1/2002 | Dekker | 369/53.3 |
| 2002/0027848 A1* | 3/2002 | Iida et al. | 369/47.51 |
| 2002/0067673 A1* | 6/2002 | Ko et al. | 369/53.21 |
| 2002/0101808 A1* | 8/2002 | Seo | 369/59.11 |
| 2002/0176338 A1* | 11/2002 | Ushiyama et al. | 369/47.53 |

FOREIGN PATENT DOCUMENTS

| | | |
|---|---|---|
| JP | 1-253828 | 10/1989 |
| JP | 3-165356 | 7/1991 |
| JP | 03-185628 | 8/1991 |
| JP | 5-182278 | 7/1993 |
| JP | 6-124496 | 5/1994 |
| JP | 6-131729 | 5/1994 |
| JP | 6-203418 | 7/1994 |
| JP | 7-240026 | 7/1995 |
| JP | 8-124160 | 5/1996 |
| JP | 9-115138 | 5/1997 |
| JP | 2000-123367 | 4/2000 |
| JP | 2000-222734 | 8/2000 |
| WO | WO 01/86642 | 11/2001 |

OTHER PUBLICATIONS

U.S. Appl. No. 10/806,106, filed Mar. 23, 2004, Yong-jin Ahn et al., Samsung Electronics Co., Ltd.
U.S. Appl. No. 10/806,107, filed Mar. 23, 2004, Yong-jin Ahn et al., Samsung Electronics Co., Ltd.
U.S. Appl. No. 10/806,318, filed Mar. 23, 2004, Yong-jin Ahn et al., Samsung Electronics Co., Ltd.
U.S. Appl. No. 10/806,319, filed Mar. 23, 2004, Yong-jin Ahn et al., Samsung Electronics Co., Ltd.
U.S. Appl. No. 10/806,215, filed Mar. 23, 2004, Yong-jin Ahn et al., Samsung Electronics Co., Ltd.
U.S. Appl. No. 11/430,169, filed May 9, 2006, Yong-jin Ahn et al., Samsung Electronics Co., Ltd.
Office Action issued by Japanese Patent Office in Japanese Patent Application No. 2006-010535 on Sep. 12, 2006.
Office Action issued May 8, 2007 by the Japan Patent Office re: Japanese Divisional Patent Application No. 2006-10535 (1 p).
Office Action issued by Russian Patent Office in Russian Patent Divional Application No. 2004111362/09(012231) on Jun. 21, 2007.
Search Report issued by European Patent Office in European Patent Application No. 07107732.5-1232 on Jun. 25, 2007.

* cited by examiner

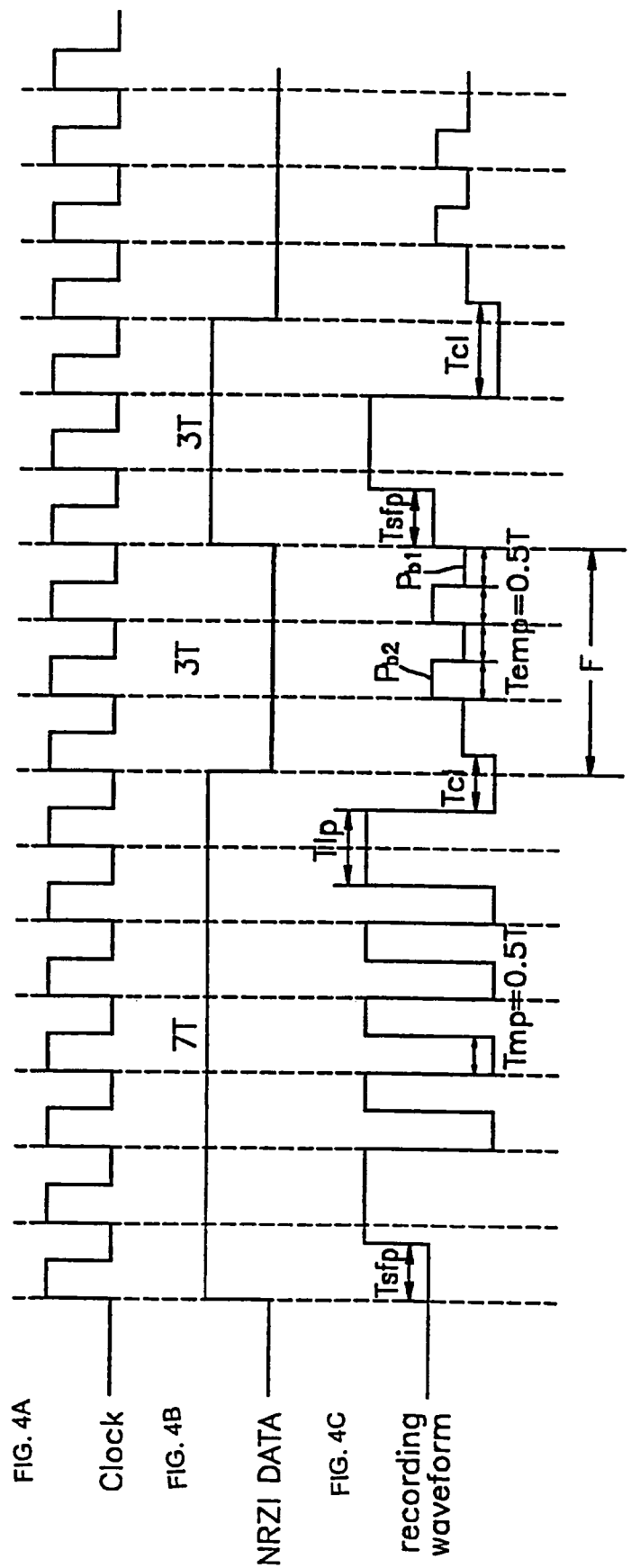
FIG. 4A Clock
FIG. 4B NRZI DATA
FIG. 4C recording waveform

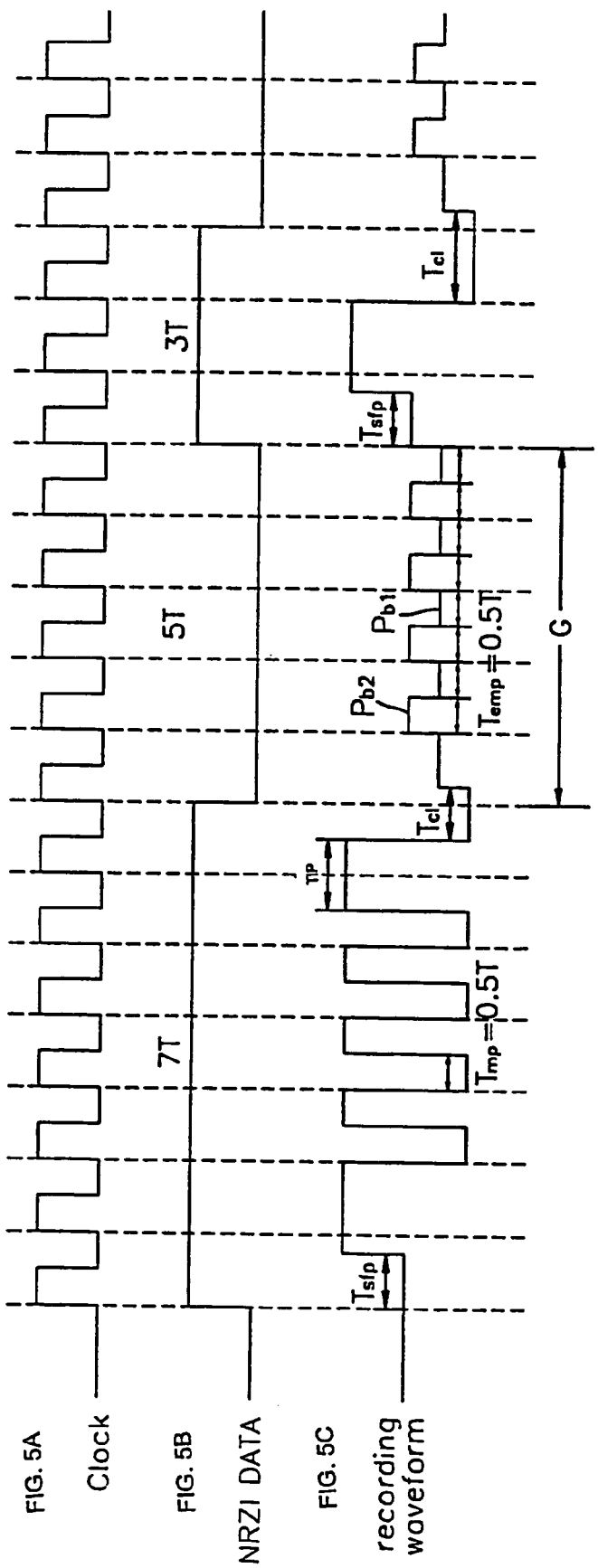

NRZI DATA (a) LH (b) HH (c) HL (d) LL (a)

(b)

(c)

(d)

(e)

(f)

(g)

(h)

(i)

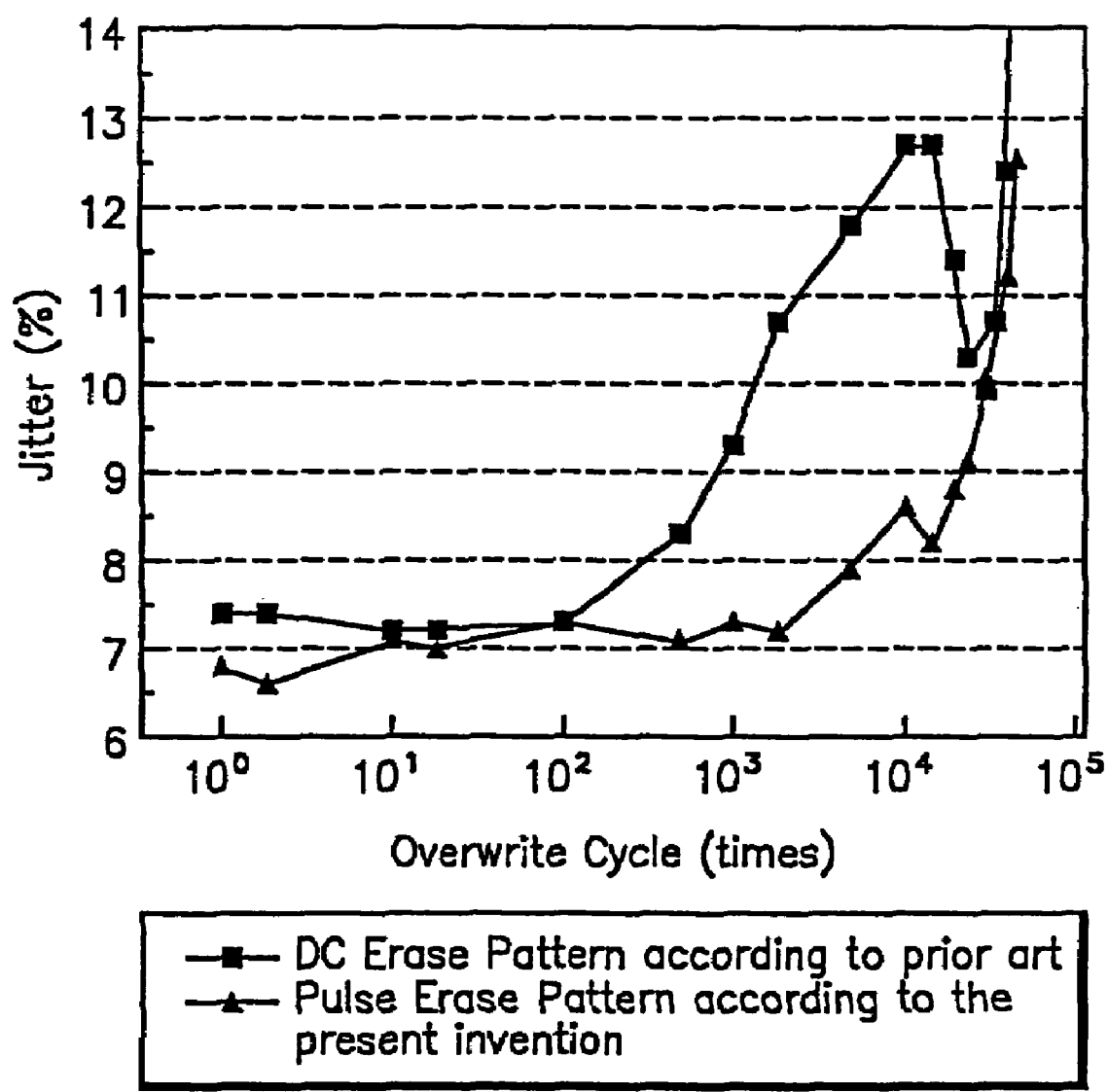

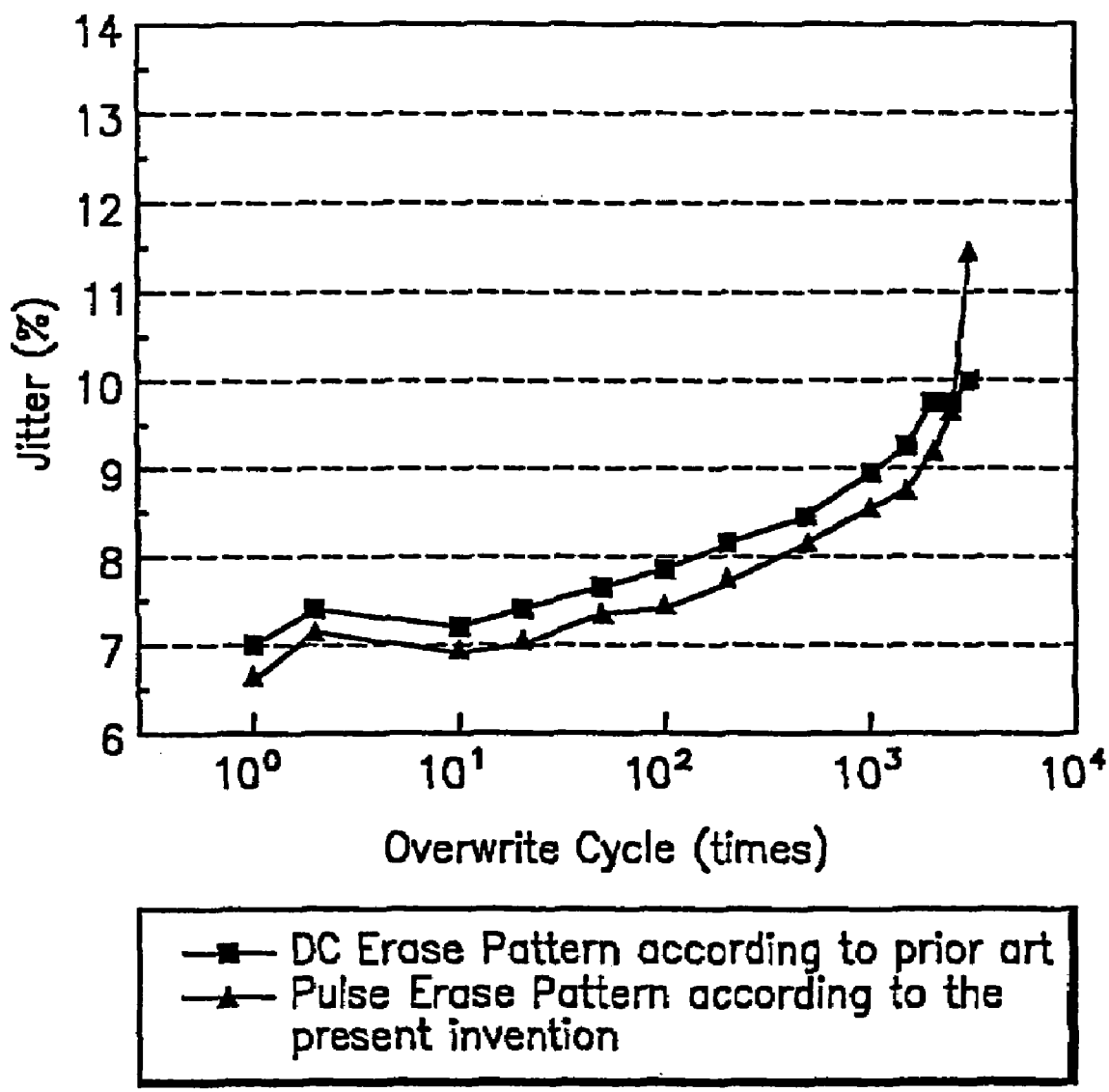

METHOD OF AND APPARATUS FOR RECORDING DATA ON OPTICAL RECORDING MEDIUM

CROSS-REFERENCE TO RELATED APPLICATIONS

This application is a continuation of prior U.S. application Ser. No. 10/256,244, filed Sep. 27, 2002. This application claims the benefit of Korean Patent Application Nos. 2001-61039, filed Sep. 29, 2001, and 2001-80541, filed Dec. 18, 2001, in the Korean Intellectual Property Office, and U.S. Provisional Application Nos. 60/327,305, filed Oct. 9, 2001, and 60/373,377, filed Apr. 18, 2002, the disclosures of which are incorporated herein by reference.

BACKGROUND OF THE INVENTION

1. Field of the Invention

The present invention relates to a method of and apparatus for recording data on an optical recording medium, and more particularly, to a method and apparatus in which digital data is recorded on an optical disc by forming a mark on the optical disc.

2. Description of the Related Art

Data are recorded on an optical disc which is one type of optical recording media, in a form of a mark on a track formed on the optical disc. A mark is formed as a pit in a read-only disc, such as a Compact Disc-Read Only Memory (CD-ROM) and a Digital Versatile Disc-Read Only Memory (DVD-ROM). In a recordable disc, such as a CD-R/RW and a DVD-R/RW/RAM, a phase-change film which is changed into a crystalline phase or an amorphous phase is formed on a recording layer, and a mark is formed by a phase change of the phase-change film.

Methods of recording data can be divided into a mark edge recording method and a mark position recording method. According to the mark position recording method, a signal of an amplitude of a detected Radio Frequency (RF) signal is changed from negative to positive or from positive to negative at a location on which a mark is recorded. According to the mark edge recording method, the signal of the amplitude of the detected RF signal is changed from negative to positive or from positive to negative at both edges of the mark. Therefore, recording the edges of the mark is an important factor in improving quality of a signal reproduced from the optical disc.

However, in a disc on which the phase-change film is coated, it is shown that a shape of a trailing edge of the mark recorded according to a prior art recording method changes according to a length of the mark or an interval between the marks, i.e., a space. That is, the trailing edge of the mark is formed greater than a leading edge of the mark such that recording/reproducing characteristics of the disc are degraded. If a recording mark is relatively long, the recording/reproducing characteristics are more degraded.

FIGS. 1A-1E are reference diagrams of recording waveforms (a), (b), and (c) to record a Non Return to Zero Inverted (NRZI) data signal according to the prior art. The recording waveform (a) is used for recording the NRZI data signal on a DVD-RAM, the recording waveforms (b) and (c) are for a DVD-RW. Here, T denotes a cycle of a reference clock. According to the mark edge recording method, a high level of NRZI data is recorded as a mark and a low level of NRZI data is formed as a space. A portion of the recording waveform used in recording the mark is referred to as a recording pattern, and another portion of the recording waveform used in forming the space (in erasing the mark) is referred to as an erase pattern. The prior art recording waveforms (a), (b) and (c) use a multi-pulse as the recording pattern, and a power of the erase pattern is maintained constant in a predetermined DC level for an interval E as shown in FIG. 1E.

Since the DC level of the erase pattern included in the prior art recording waveform is maintained constant for a predetermined period of time, 0~200° C. heat is continuously applied to a corresponding area to form the space. Therefore, if recording is repeatedly performed, a shape of the mark is degraded and distorted such that the recording/reproducing characteristics of the optical disc are degraded. In particular, a development toward a high density and a high line speed for recording more data on the optical disc makes the clock cycle T shorter, and therefore a heat interference between pulses forming the recording waveform increases to cause more degradation of the recording/reproducing characteristics of the optical disc.

Meanwhile, in the prior art, the different recording waveforms are used according to the kinds of the optical discs and specifications, such as DVD-RAM and DVD-RW, because characteristics of recording films of the optical discs are different. In particular, due to the fact that the different recording waveforms should be used for each kind of the optical discs, a problem occurs in manufacturing a multi-drive which can record/reproduce all specifications of the optical discs because the multi-drive should accommodate a variety of the different recording waveforms. The problem causes an increase in cost.

SUMMARY OF THE INVENTION

To solve the above and/or other problems, it is an object of the present invention to provide a recording method and apparatus in which distortion of shapes of a leading edge and a trailing edge of a mark and degradation of the mark caused by repeated recording operations can be prevented.

It is another object of the present invention to provide a recording method and apparatus in which data is recorded by a recording waveform having an erase pattern which can improve a shape of a mark or a space.

It is yet another object of the present invention to provide a recording method and apparatus in which data is recorded by a recording waveform which can be applied to a disc having a recording film with a variety of characteristics.

Additional objects and advantages of the invention will be set forth in part in the description which follows and, in part, will be obvious from the description, or may be learned by practice of the invention.

To accomplish the above and/or other objects of the present invention, there is provided a method of recording data on an optical recording medium. The method includes forming a mark or a space by using a recording waveform having an erase pattern containing a multi-pulse.

According to an aspect of the present invention, data is recorded according to a Run Length Limited (RLL) (2, 10) process in which 2 and 10 are a minimum length and a maximum length of the mark or space, respectively, a first level of a predetermined Non Return to Zero Inverted (NRZI) data signal is recorded as the mark, and a second level of the predetermined NRZI data signal is recorded as the space.

Also, to accomplish the above and/or other objects of the present invention, there is provided a method of recording data on the optical recording medium. The method includes generating a channel modulated digital data (NRZI data) signal, generating the recording waveform having the erase pattern containing the multi-pulse and the recording pattern, and forming the first level of the charnel modulate digital data signal as the mark and forming the second level of the channel modulate digital data signal as the space by using the generated recording waveform.

According to an aspect of the present invention, the method is based on the Run Length Limited (RLL) (2, 10) or RLL (1, 7) process in which 1 and 7 are the minimum length and the maximum length of the mark or space.

According to another aspect of the present invention, a power level of a leading pulse of the erase pattern is a low level of the multi-pulse and another power level of a trailing pulse is a high level of the multi-pulse. Alternatively, the power level of the leading pulse of the erase pattern may be the high level of the multi-pulse, and the power level of the trailing pulse may be the high level of the multi-pulse. The power level of the leading pulse of the erase pattern may be the low level of the multi-pulse and the power level of the trailing pulse may be the low level of the multi-pulse. The power level of the leading pulse of the erase pattern may be the high level of the multi-pulse and the power level of the trailing pulse may be the low level of the multi-pulse.

According to another aspect of the present invention, a ratio of a duration time of the high level and another duration time of the low level of the multi-pulse is substantially 1:1, and the duration time of the high level is half a clock cycle.

It is possible that in the generating of the channel modulated digital data, the first level of the NRZI data signal is formed as the mark, and in the generating of the recording waveform, the second level of the NRZI data signal is formed as the space.

The recording waveform includes a cooling pulse, and the erase pattern includes a part of the cooling pulse. It is possible that if an ending time of the cooling pulse is less than or greater than 0.5Ts from the trailing edge of the NRZI data, the duration time of the leading pulse forming the erase pattern increases over 0.5Ts when T is a cycle of a reference clock signal.

According to another aspect of the present invention, a unit pulse constituting or included in the multi-pulse has a high level and a low level that are adjusted by the duration time of the leading pulse of the recording pattern.

According to another aspect of the present invention, the recording pattern has at least two power levels.

Also, to accomplish the above and/or other objects of the present invention, there is provided an apparatus for recording data on the optical recording medium. The apparatus includes a recording waveform generating unit which generates the recording waveform having the erase pattern containing the multi-pulse and the recording pattern, and a pickup unit which applies light to the optical recording medium according to the generated recording waveform so that the mark or the space is formed.

According to another aspect of the present invention, the apparatus also includes a channel modulation unit which channel-modulates input data received from an outside source and outputs the generated NRZI data signal to the recording waveform generating unit.

According to another aspect of the present invention, the pickup unit includes a motor which rotates the optical recording medium, an optical head which applies a laser beam to the optical recording medium or receives the laser beam reflected from the optical recording medium, a servo circuit which servo-controls the motor and the optical head, and a laser driving circuit which drives a laser device installed in the optical head to generate the laser beam.

BRIEF DESCRIPTION OF THE DRAWINGS

The above objects and/or advantages of the present invention will become more apparent and more readily appreciated from the following description of the preferred embodiments, taken in conjunction with the accompanying drawings of which:

FIGS. 4A-4C show an example of a waveform generated by a recording waveform generating circuit of the recording apparatus of FIG. 3;

FIGS. 5A-5C show another example of a waveform generated by the recording waveform generating circuit of the recording apparatus of FIG. 3;

FIGS. 11A through 15 are graphs showing characteristics of a DVD-RAM;

FIGS. 16A through 20 are graphs showing characteristics of a DVD-RW; and

DETAILED DESCRIPTION OF THE PREFERRED EMBODIMENTS

Figure 1:
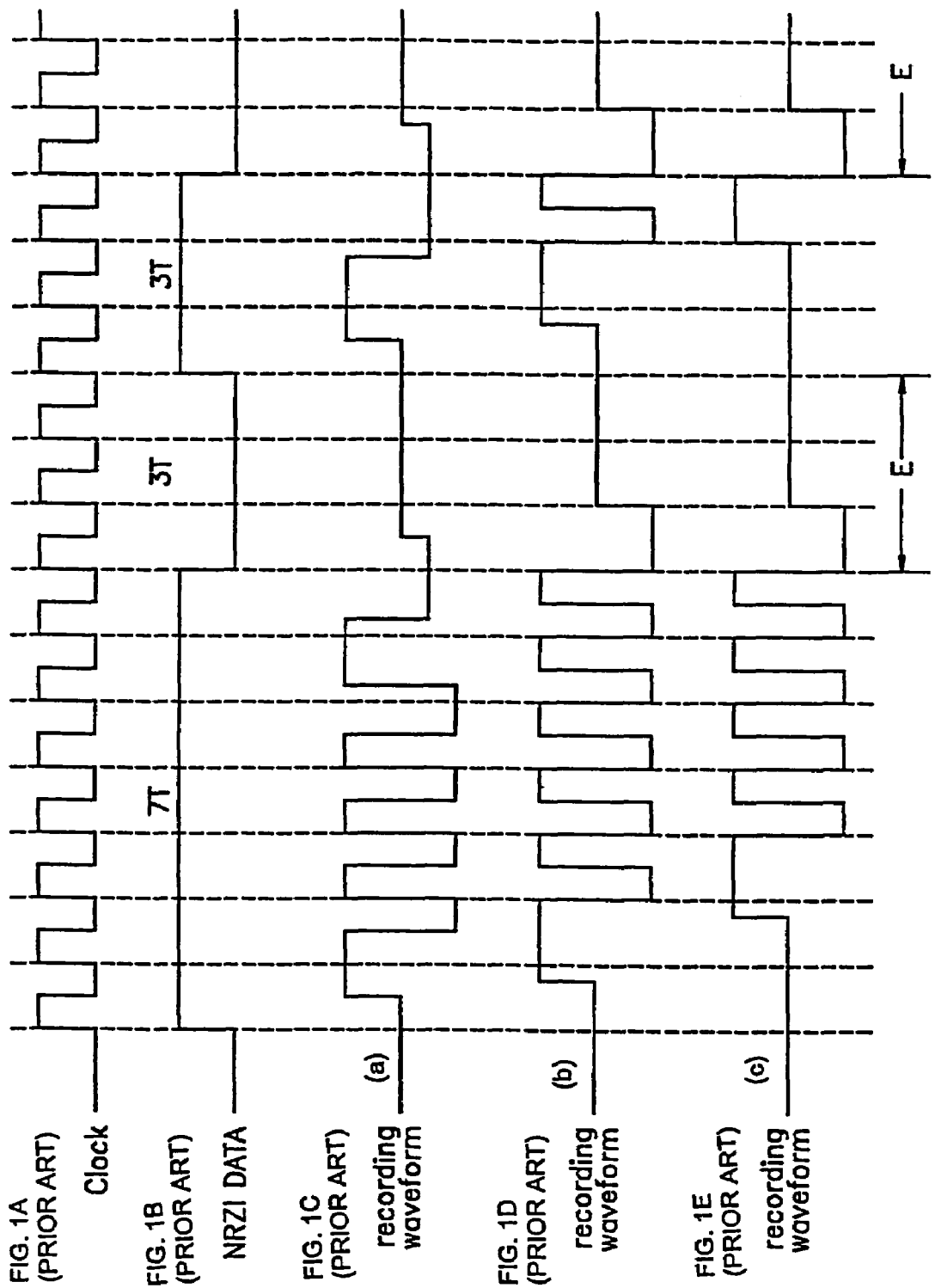
FIGS. 1A-1E are reference diagrams of recording waveforms according to the prior art.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 2:
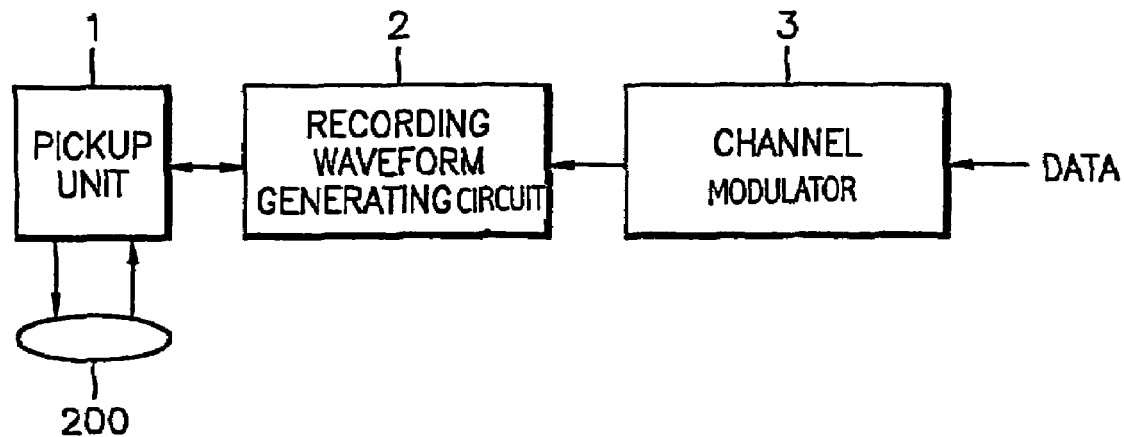
FIG. 2 is a block diagram of a recording apparatus according to an embodiment of the present invention.

FIG. 2 is a block diagram of a recording apparatus according to an embodiment of the present invention. Referring to FIG. 2, the recording apparatus which forms a mark or a space on an optical recording medium (optical disc) 200, has a pickup unit 1, a recording waveform generating circuit 2, and a channel modulator 3.

The channel modulator 3 modulates input data which is input from an outside source into a channel bit stream, such as a Non Return to Zero Inverted (NRZI) data signal. The recording waveform generating circuit 2 receives the channel bit stream and generates a recording waveform to record the received channel bit stream. The recording waveform generated according to the embodiment of the present invention has an erase pattern having an erase multi-pulse. The recording waveform will be explained later in detail. The pickup unit 1 applies light (a laser beam) to the optical recording medium 200 according to the generated recording waveform so as to form the mark or the space.

Figure 3:
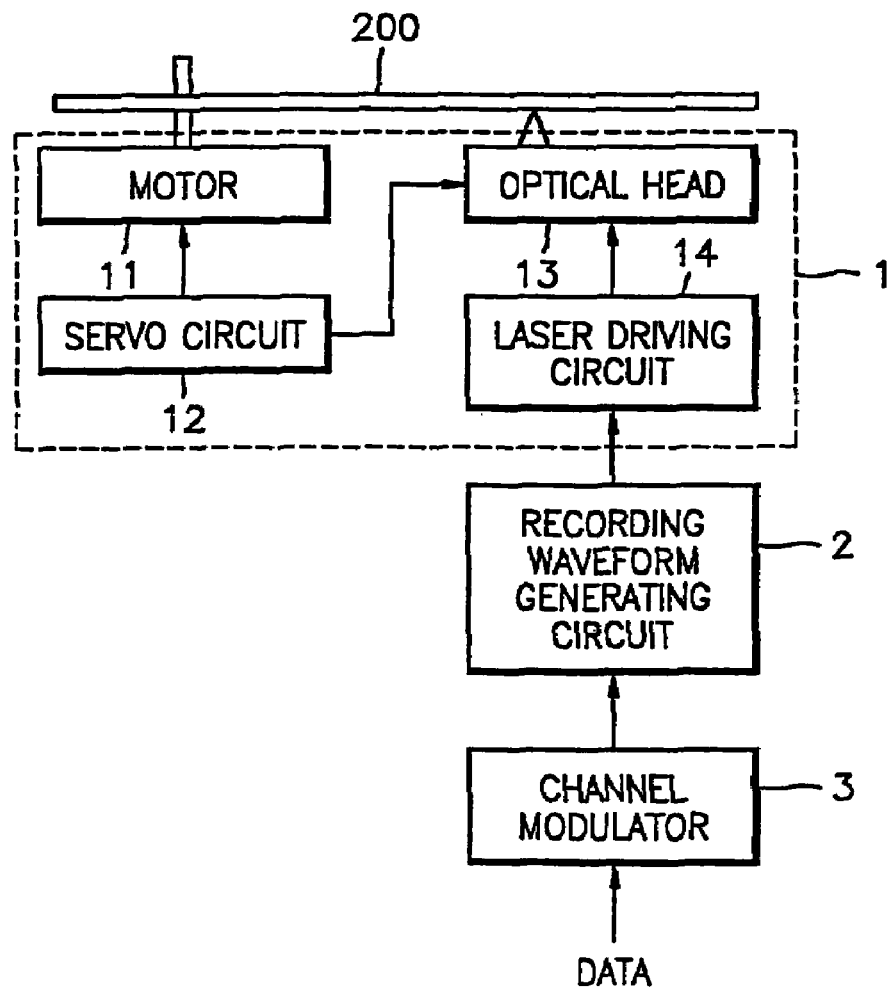
FIG. 3 shows an example of an implementation of the recording apparatus of FIG. 2.

FIG. 3 shows an example of an implementation of the recording apparatus of FIG. 2. The same blocks will be indicated by the same reference numerals, and the same explanation will be omitted. Referring to FIG. 3, the recording apparatus includes the pickup unit 1, the recording waveform generating circuit 2, and the channel modulator 3. The pickup unit 1 has a motor 11 rotating the optical disc 200, an optical head 13 receiving the light reflected from the optical disc 200, a servo circuit 12 controlling the motor and the optical head, and a laser driving circuit 14 driving a laser device (not shown) installed in the optical head 13 to generate the light.

The channel modulator 3 modulates the input data into the channel bit stream and outputs the NRZI data signal. The recording waveform generating circuit 2 generates the recording waveform to record the NRZI data signal and provides the recording waveform to the laser driving circuit 14. The laser driving circuit 14 forms the mark or the space by controlling the laser device in accordance with the received recording waveform.

FIGS. 4A-4C show an example of the recording waveforms generated by the recording waveform generating circuit 2. Referring to FIGS. 4A-4C, the NRZI data signal is changed from the input data according to a modulation method of the channel modulator 3. That is, if the modulation method is a Run Length Limited (RLL) (2, 10) series method. That is, according to an Eight to Fourteen Modulation (EFM) method, an Eight to Fourteen Modulation plus (EFM+) method, a D(8-15) method, and a Dual modulation method, a minimum length of the mark or the space is 3Ts and a maximum length of the mark or the space is 11Ts, where T is a cycle of a clock signal as shown in FIG. 4A, The D(8-15) method is a modulation method disclosed in "Optical Disc Recording System of 25 GB Capacity" announced by Matsushita in Optical Data Storage (ODS) 2001. The Dual modulation method is disclosed in Korean Patent Application No. 99-42032 titled "An RLL code allocation method, modulation and demodulation method, and demodulation apparatus having improved DC controlling capability," filed by the present applicant on Sep. 30, 1999, and published on Nov. 25, 2000. If data is recorded using the RLL(1, 7) series method, the minimum length is 2Ts, and the maximum length is 8Ts.

When a high level of the NRZI data signal is formed as the mark and a low level of the NRZI data signal is formed as the space, the recording waveform includes a recording pattern to record a mark of a 7T length, an erase pattern to form a space of a 3T length, and another recording pattern to record a mark of a 3T length as shown in FIG. 4B.

The recording pattern includes a pulse train, e.g., a multi-pulse. Also, the erase pattern is formed with another pulse train, e.g., another multi-pulse (erase multi-pulse) having an interval F as shown in FIG. 4C. Tmp indicates a width of a pulse of the multi-pulse of the recording pattern. Here, the multi-pulse indicates at least one pulse having the same width and power. However, it is understood that the present invention is not limited thereto. That is, the width and the power of each pulse of the multi-pulse may vary. In the present embodiment, Tmp is 0.5Ts. Tlp indicates a width of a last pulse of the recording pattern. Tcl indicates a width (duration time) of a cooling pulse. The cooling pulse extends from the recording pattern to the erase pattern. Temp indicates a width of a pulse of the multi-pulse of the erase pattern. In the present embodiment, Temp is 0.5Ts. Tsfp indicates a period from a point where the NRZI data signal is transited from the low level to the high level at a point (start point of a first pulse) when the first pulse forming the recording pattern starts. Tsfp is under an influence of a power level of the erase pattern. That is, as shown in FIG. 4C, if Tsfp is greater than 0.5Ts and the multi-pulse contained in the erase pattern ends at low level Pb1, a next Tsfp starts from a high level Pb2 of the multi-pulse. Meanwhile, if Tsfp is less than 0.5Ts and the multi-pulse contained in the erase pattern ends at a low level Pb1, the next Tsfp maintains the low level Pb1 of the multi-pulse.

FIGS. 5A-5C show another example of waveforms generated by the recording waveform generating circuit 2. Referring to FIG. 5B, when the high level of the NRZI data signal is formed as the mark, and the low level is formed as the space, the recording waveform includes the recording pattern to record a mark of a 7T length, the erase pattern to form a space of a 5T length, and the recording pattern to record a mark of a 3T length.

The recording pattern includes the pulse train. Also, the erase pattern is formed with the pulse train, e.g., the multi-pulse (erase multi-pulse) having an interval G as shown in FIG. 5C. Tmp indicates the width of the multi-pulse forming the recording pattern. Here, the multi-pulse indicates at least one pulse having the same width and power. However, it is understood that the present invention is not limited thereto. That is, the width and the power of each pulse of the multi-pulse may vary. In the present embodiment, Tmp is 0.5Ts. Tlp indicates the width of the last pulse forming a recording pattern. Tcl indicates the width (duration time) of the cooling pulse. The cooling pulse extends from the recording pattern to the erase pattern. Temp indicates the width of the erase multi-pulse constituting the erase pattern. In the present embodiment, Temp is 0.5Ts. Tsfp indicates a period from a point where the NRZI data is transited from the low level to the high level at the point (start point of the first pulse) when the first pulse constituting the recording pattern starts. Tsfp is determined in response to the power level of the erase pattern. That is, as shown in FIG. 5C, if Tsfp is greater than 0.5Ts and the multi-pulse contained in the erase pattern ends at low level Pb1, the next Tsfp starts from the high level Pb2 of the multi-pulse. Meanwhile, if Tsfp is less than 0.5Ts and the multi-pulse contained in an erase pattern ends at the low level Pb1, the next Tsfp maintains the low level Pb1 of the multi-pulse.

FIGS. 6A through 6E are waveforms explaining four types of the erase patterns according to another embodiment of the present invention. Referring to FIGS. 6A through 6E, the erase patterns are divided into the four types: (a) LH, (b) HH, (c) HL, and (d) LL. Differences between the power levels of the erase patterns are marked with circles so that the differences can be easily understood as shown in FIGS. 6B through 6E.

First, the (a) LH indicates that a power of a leading pulse of the erase pattern is the same as the low level Pb1 of the following pulse of the erase multi-pulse, and when a last pulse of the erase multi-pulse of the erase pattern ends at the low level Pb1, the power level of the following Tsfp is the same as the high level Pb2 of the erase multi-pulse. The (b) HH indicates that the power of the leading pulse forming the erase pattern is the same as the high level Pb2 of the following pulse of the erase multi-pulse, and when the last pulse of the erase multi-pulse of the erase pattern ends at the high level Pb2, the level of the following Tsfp continues to be the same high level Pb2 of the erase multi-pulse. The (c) HL indicates that the power of the leading pulse forming the erase pattern is the same as the high level Pb2 of the following pulse of the erase multi-pulse, and when the last pulse of the erase multi-pulse of the erase pattern ends at the high level Pb2, the level of the following Tsfp is the same as the low level Pb1 of the erase multi-pulse. Finally, the (d) LL indicates that the power of the leading pulse forming the erase pattern is the same as the low level Pb1 of the following pulse of the erase multi-pulse, and when the last pulse of the erase multi-pulse of the erase pattern ends at the low level Pb1, the level of the following Tspf continues to be the same low level Pb1 of the erase multi-pulse.

Figure 6A:
FIGS. 6A through 6E are waveforms explaining four types of erase patterns according to another embodiment of the present invention.
Figure 6B:
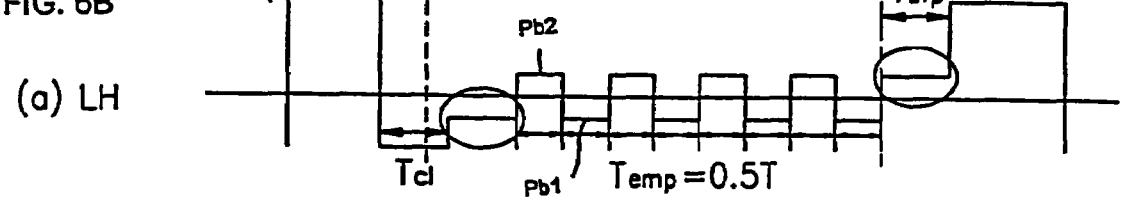
Figure 6C:
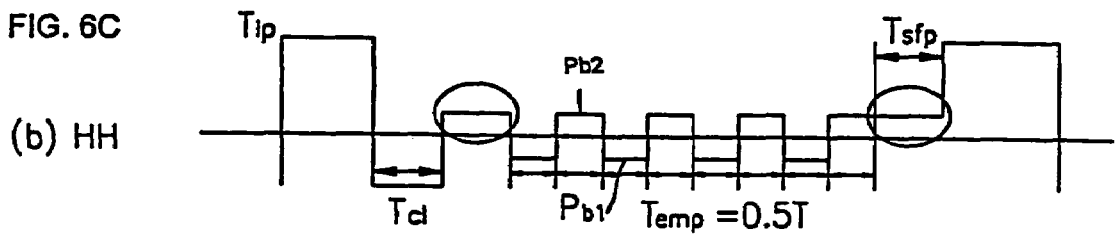
Figure 6D:
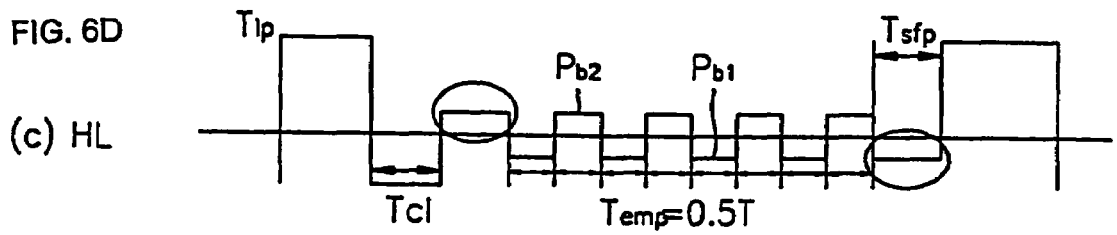
Figure 6E:
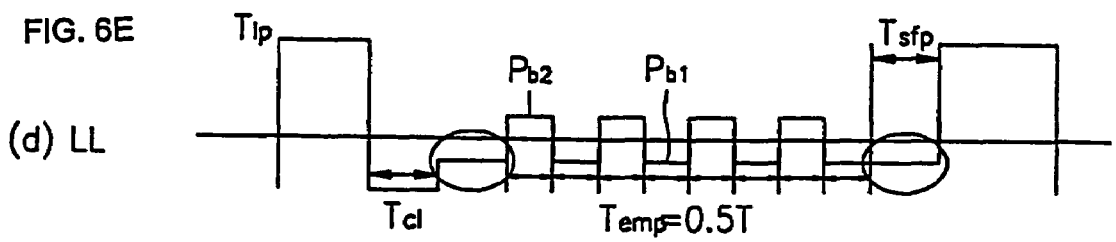
Figure 7A:
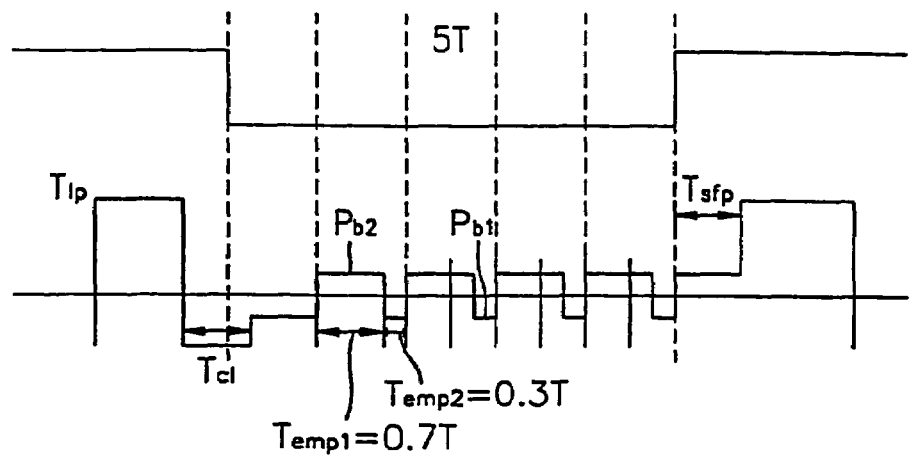
FIGS. 7A and 7D are other examples of the erase pattern of FIG. 6B.
Figure 7C:
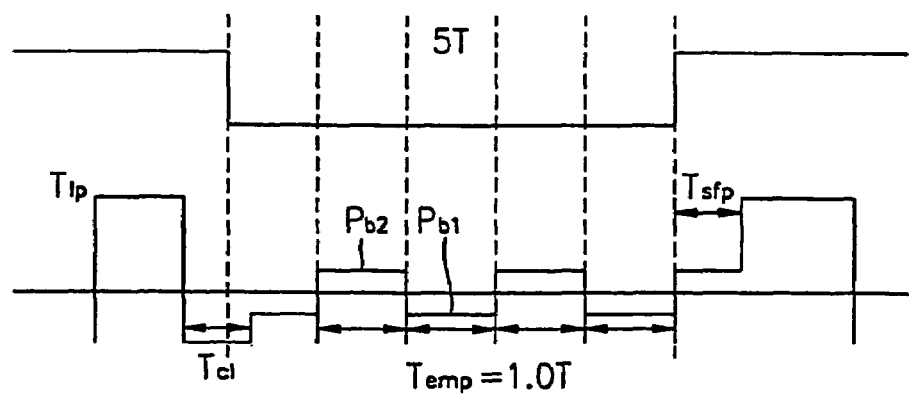

FIGS. 7A and 7D are other examples LH2 and LH3 of LH of FIG. 6B. Referring to FIGS. 7A and 7D, the (e) LH2 is the same as (a) LH of FIG. 6B, except that Temp1, a duration time of the high level Pb2 of the multi-pulse forming a cycle, is 0.7Ts and Temp2, a duration time of the low level Pb1 of the multi-pulse, is 0.3Ts. Also, the (f) LH3 is the same as (a) LH of FIG. 6B, except that the duration time of the high level Pb2 or the low level Pb1 of the multi-pulse is 1.0T. Here, a ratio of Temp1 and Temp2, that is, the ratio of the duration time of the high level Pb2 and that of the low level Pb1 of the multi-pulse forming a cycle can be changed as m:n in a variety of ways. (Here, m and n are integers.) Thus, the recording waveform according to the present invention has the erase pattern containing the multi-pulse (erase multi-pulse) of which power is the high level Pb2 or the low level Pb1, and therefore distortion of the trailing edge of the mark is prevented and the reproducing characteristic of the optical disc is improved. In particular, in the recording waveforms shown in the embodiments described above, the duration time of the high level Pb2 and the low level Pb1 of the multi-pulse is adjusted within a range between 0.25Ts and 0.75Ts for a clock cycle T, and a duration time appropriate to heat characteristic of the optical disc 200 is selected. Therefore, the reproducing characteristic of the optical disc is more improved.

Meanwhile, information on the four types of the erase patterns (type information) may be recorded in a lead-in area of a recordable disc (optical disc) or may be included in a wobble signal as one of header information items. In this case, when data are recorded, the recording apparatus reads type information from the lead-in area or from the wobble signal to form the mark or the space by generating a corresponding recording waveform.

In addition, the four types of the erase patterns may be used as a symbol indicating multiple times speed of the disc or the kind of the mark when data is recorded and reproduced. For example, the erase pattern may indicate information of "the speed of a disc using LH type erase pattern is 20-multiple times speed."

In order to test an effect of the present invention, shapes of the mark recorded in a simulation were observed. A structure used in the simulation is shown in table 1. The disc used in the simulation has a 4-layered film structure.

TABLE 1

|  | Substrate | Dielectric film | Recording film | Dielectric film | Reflecting film |
|---|---|---|---|---|---|
| Material | PC | ZnS—SiO$_2$ | Sb—Te eutectic | ZnS—SiO$_2$ | Ag alloy |
| Thickness | 0.6 mm | 128 nm | 14 nm | 16 nm | 30 nm |

Figure 8A:
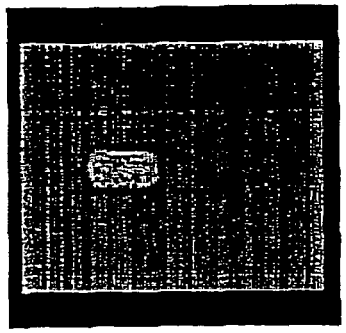
FIGS. 8A through 10C are shapes of marks recorded in a simulation.
Figure 8B:
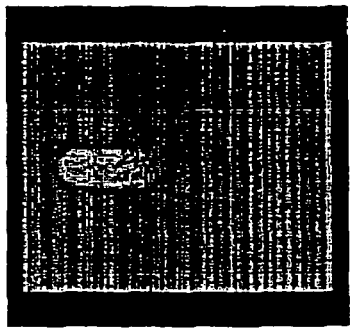
Figure 8C:
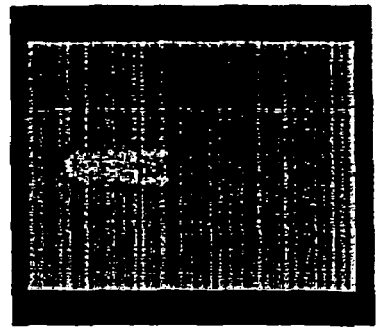
Figure 9A:
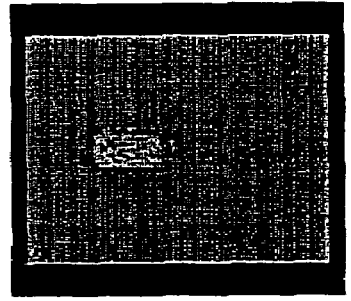
Figure 9B:
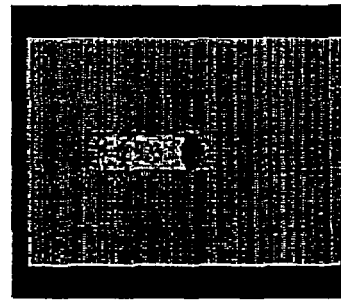
Figure 9C:
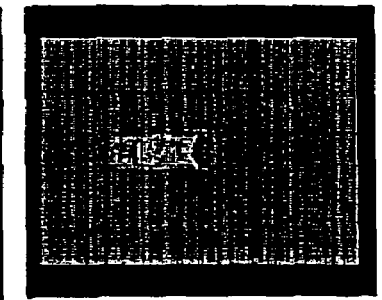
Figure 10A:
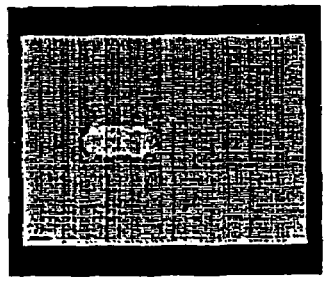
Figure 10B:
Figure 10C:
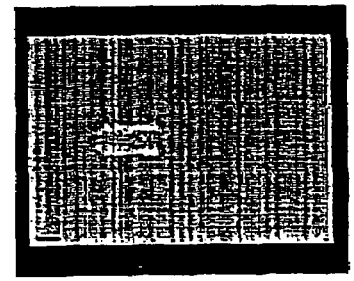

Each condition of the simulations includes a wavelength of 405 nm, a numeral aperture (NA) of 0.65, and a linear velocity of 6 m/s. In order to observe the shape of the mark, after a recording mark of 8T is recorded, a next recording mark of 8T is recorded by overlapping 4T of the previous recording mark of 8T. FIGS. 8A through 10C show comparison results between the mark shapes when the prior art recording waveform was used and the mark shapes when the recording waveform according to the present invention was used. FIG. 8A, shows a mark (a) formed by the simulation, FIG. 8B shows a mark (b) formed on the mark (a) by a recording waveform according to the present invention, and FIG. 8C shows a mark (c) formed on the mark (a) by the prior art recording waveform. Likewise, FIG. 9A shows a mark (d) formed by the simulation, FIG. 9B shows a mark (e) formed by the recording waveform having the erase pattern according to the present invention, and FIG. 9C shows a mark (f) formed by the recording waveform having the prior art DC erase pattern. FIG. 10A shows a mark (g) formed by the simulation, FIG. 10B shows a result of erasing the mark (g) by the erase pattern according to the present invention, and FIG. 10C shows a result of erasing the mark (g) by the prior art DC erase pattern.

Table 2 shows parameters of thin films of the optical disc used in another simulation for interpreting heat.

TABLE 2

| Material | λ = 405 nm | | | |
|---|---|---|---|---|
|  | n | K | C(J/cm$^3$K) | k(W/cmK) |
| ZnS—SiO$_2$ | 2.300 | 0.000 | 2.055 | 0.0058 |
| Sb—Te eutectic (Crystal) | 1.650 | 3.150 | 1.285 | 0.0060 |
| Sb—Te eutectic (Amorphous) | 2.900 | 2.950 | 1.285 | 0.0060 |
| Ag alloy | 0.170 | 2.070 | 2.450 | 0.2000 |

Referring again to simulation results of FIGS. 8A through 10C, it is shown that the trailing edge of the mark (b) formed by the recording waveform having the erase pattern according to the present invention as shown in FIG. 8B is better than the trailing edge of the mark (c) formed by the recording waveform having the prior art DC erase pattern of the prior art method as shown in FIG. 8C. Like the trailing edges, the shape of the leading edge of the mark is better when the erase pattern according to the present invention as shown in FIG. 9B. The results of the simulation show that the shape of the mark when the recording waveform having the erase pattern formed with the erase multi-pulse is used, is improved compared with the prior art. By adjusting the shape, width, and power level of the erase multi-pulse, distortion of the shape of the mark can be more reduced.

In order to experimentally verify the effect of the present invention, parameters needed in obtaining the recording waveforms shown in FIGS. 4A through 5C, that is, the duration time and the power level, were obtained from a 4.7 GB DVD-RAM disc and a 4.7 GB DVD-RW disc using a DVD evaluator of which the laser wavelength is 650 nm and the NA is 0.60. Then, characteristics of repetitive recording/reproducing the NRZI data signal according to the present invention were compared with the prior art method.

Figure 11A:
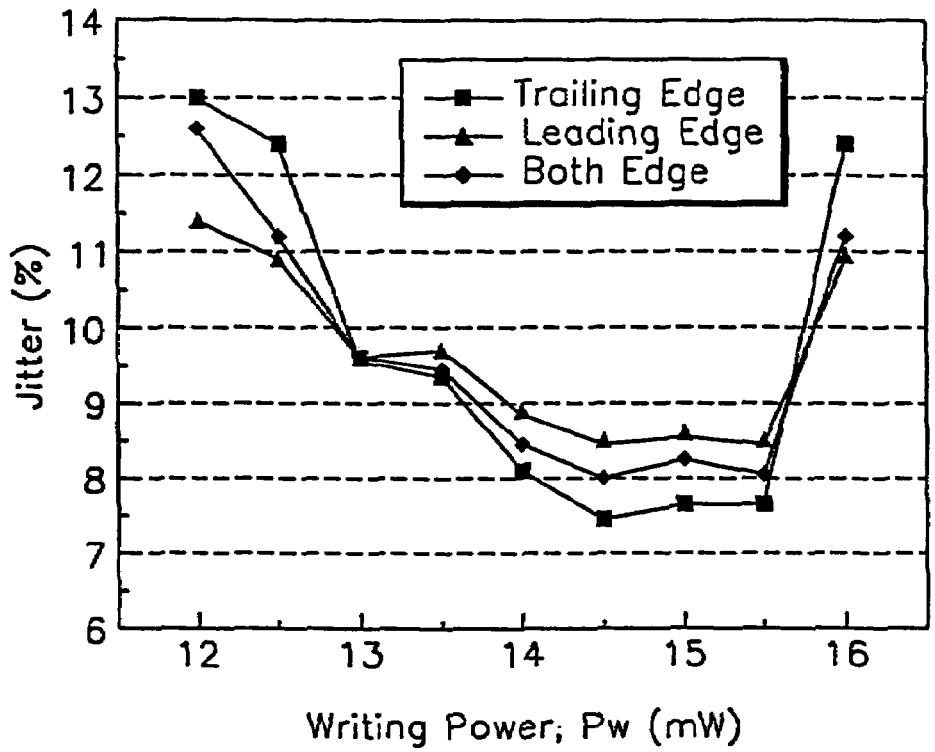
Figure 11B:
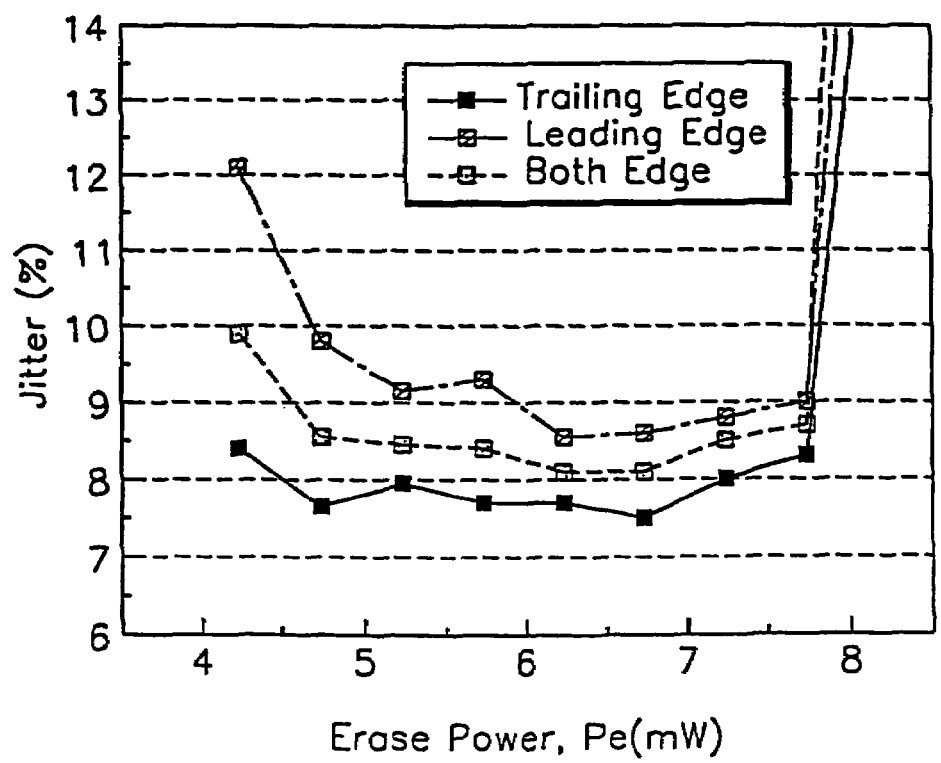
Figure 12A:
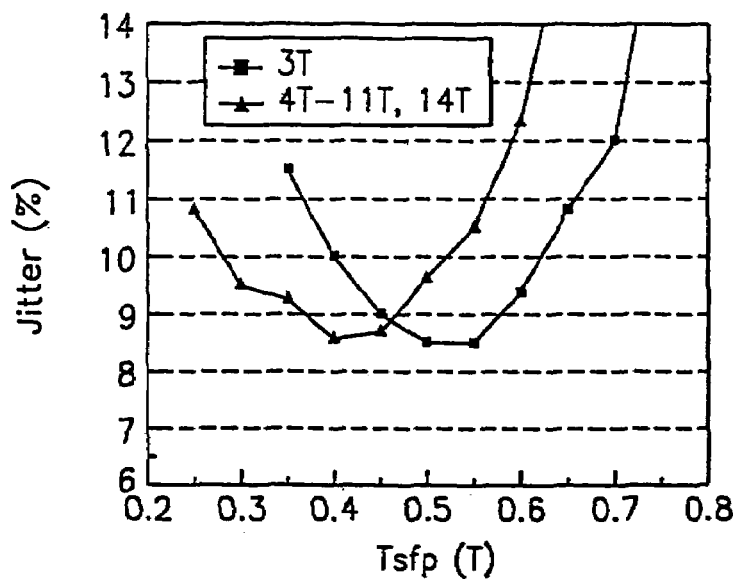
Figure 12B:
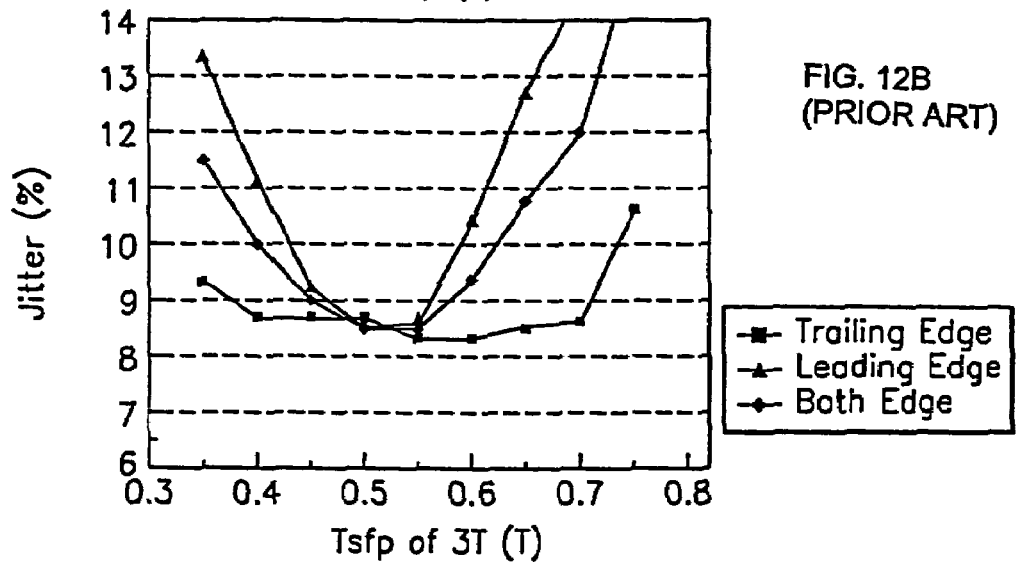
Figure 12C:
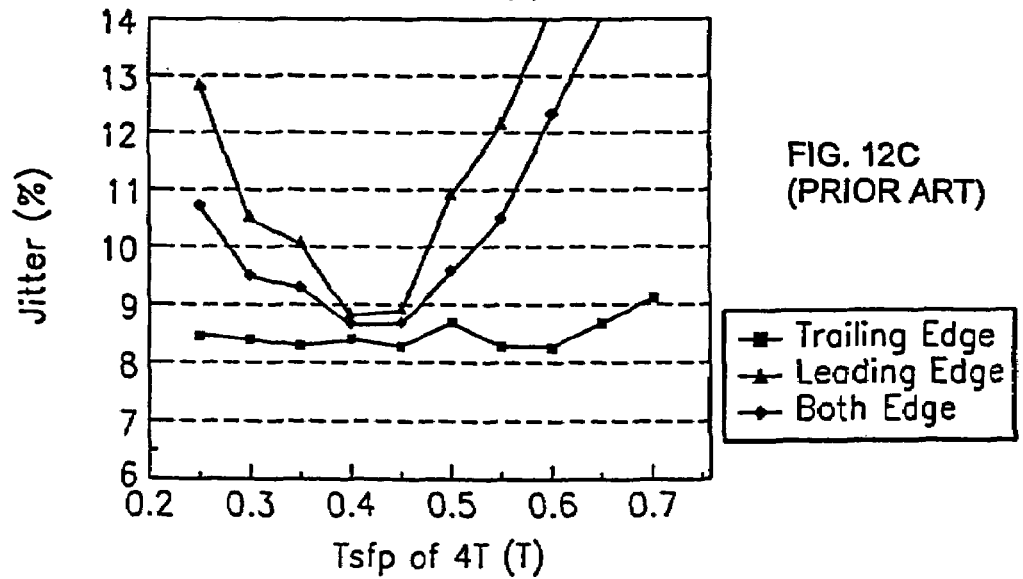
Figure 13A:
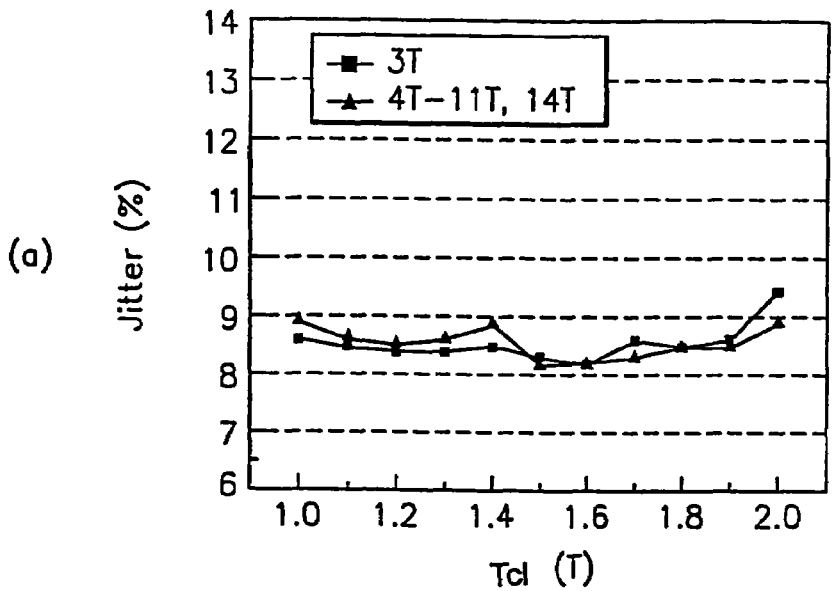
Figure 13B:
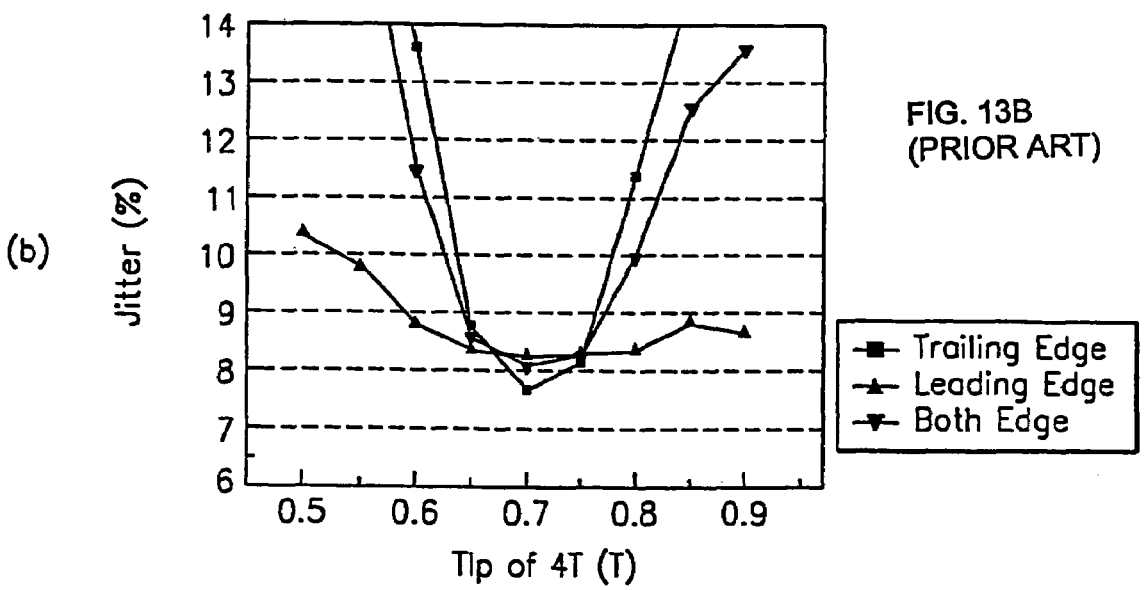

FIGS. 11A through 15 are graphs showing the characteristics of the DVD-RAM. FIGS. 11A through 13B show features of power and time of recording the NRZI data signal using the recording waveform with the DC erase pattern of the prior art, and FIGS. 14A, 14B, and 15 show improved features of recording the NRZI data signal using the recording waveform of the present invention. FIGS. 11A and 11B show jitter characteristics with respect to recording power and erase power, respectively, for the leading edge, trailing edge, and both edges of the mark in the prior art DC erase. Based on the jitter characteristics, 14.5 mW recording power and 6 mW erase power were selected for experiments.

FIGS. 12A through 13B show the measured results in the prior art DC erase. Referring to FIGS. 12A-12G and FIGS. 13A and 13B, the most preferable jitter characteristics are shown when Tsfp=0.5Ts and when Tsfp=0.4Ts. Tcl didn't affect the jitter characteristics, and Tlp was good when the cycle is 0.7Ts.

Based on the parameters experimentally obtained in this way, the mark was formed with the recording waveform having the four types of erase patterns described above, and the characteristics of the formed mark were measured as the following.

Figure 14A:
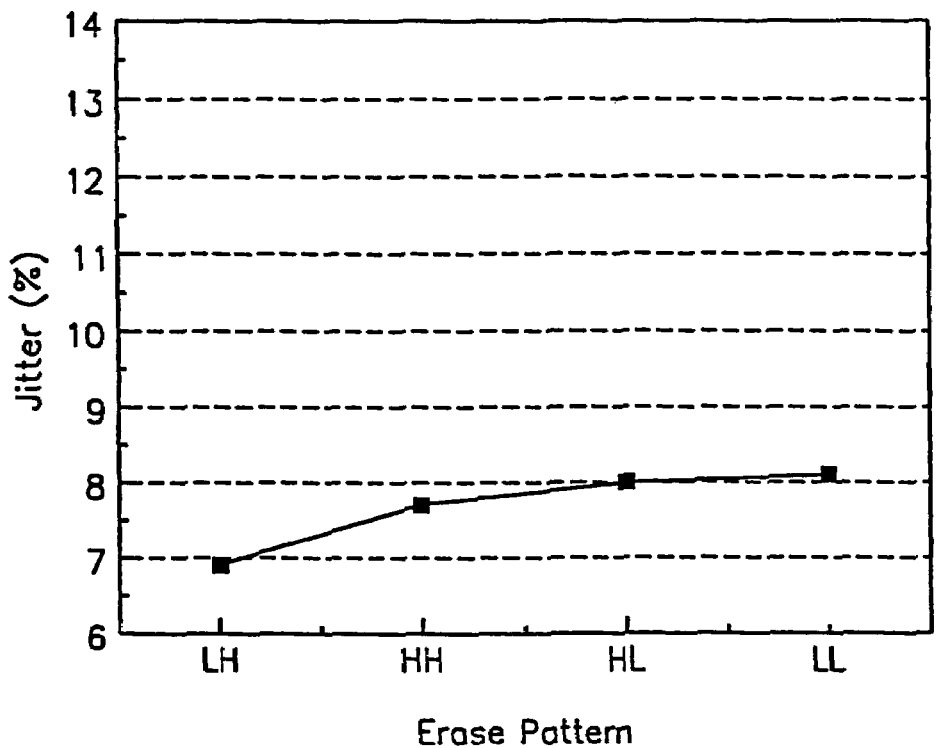
Figure 14B:
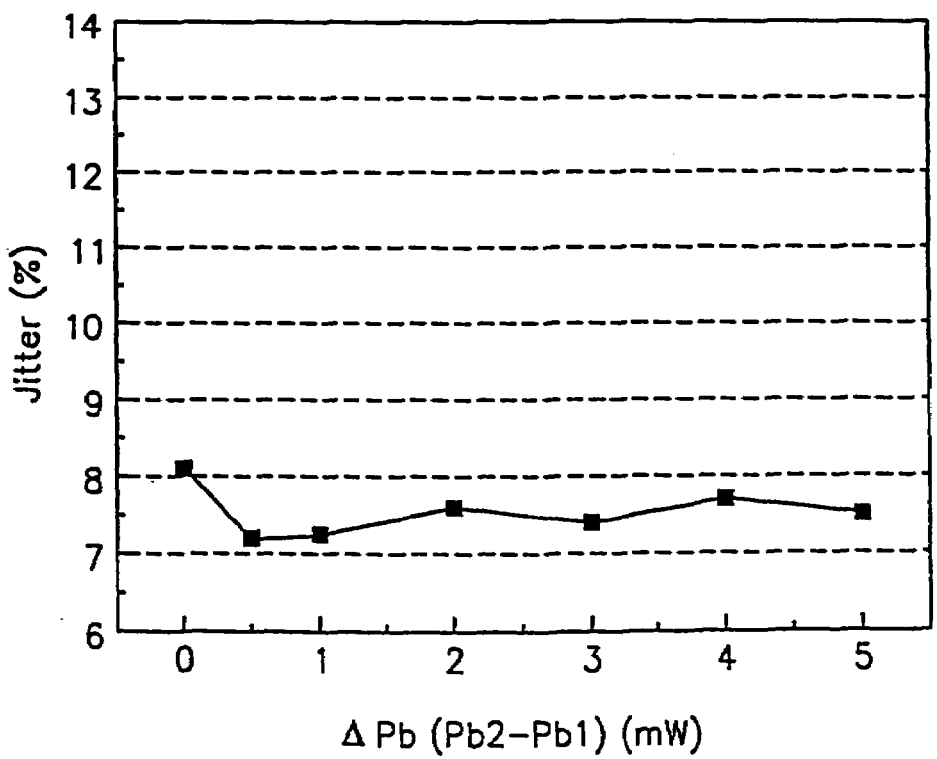

FIGS. 14A and 14B show the jitter characteristics of the four types according to the present invention shown in FIG. 6.

Referring to FIGS. 14A and 14B, it can be inferred that jitter characteristic is good when the NRZI data signal is recorded using the recording waveform with the erase pattern, i.e., any one of the four types of the erase pattern shown in FIGS. 6A-6E, of the present invention. Especially, referring to FIG. 14A, it is shown that the LH type is the best among the four types. Referring to FIG. 14B, when the erase pattern formed with the erase multi-pulse according to the present invention is used in erasing the mark, the jitter characteristics of Pb (Pb2−Pb1), which is a difference between the high level and the low level of the erase multi-pulse, is shown. It is shown that up to 5 mWs there is no big difference.

FIG. 15 shows the jitter characteristics of the results of repetitive recording/reproducing using the recording waveform having the erase pattern according to the present invention compared with the prior art. Referring to FIG. 15, it is easily understood that when the mark is erased using the erase multi-pulse according to the present invention, the result is good, especially in the repetitive recording characteristics aspect.

Figure 19A:
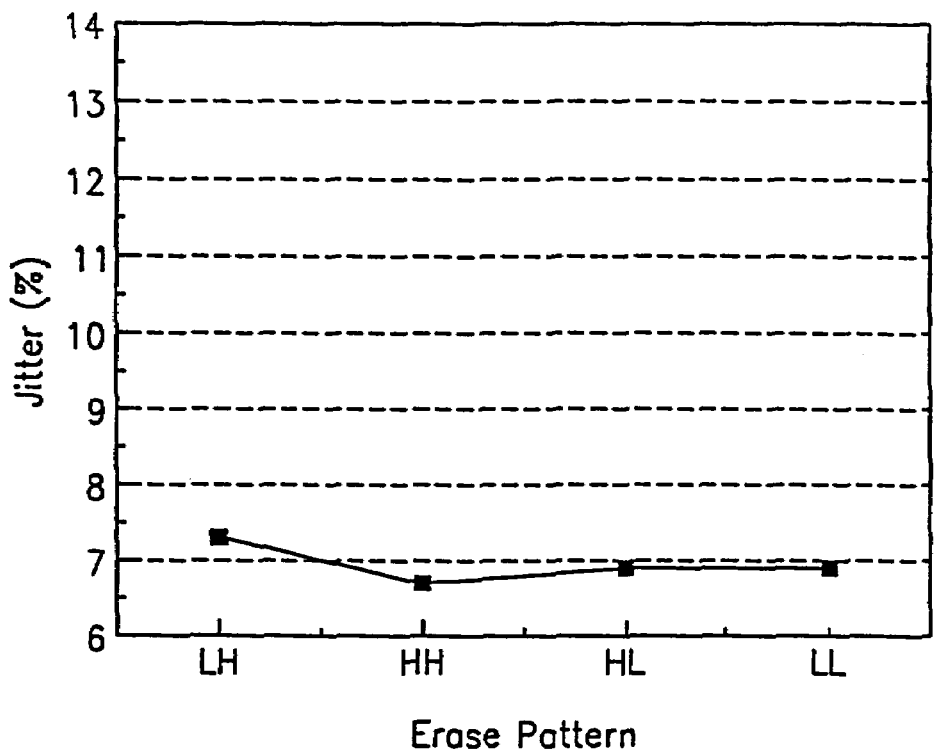

FIGS. 16A through 20 are graphs showing characteristics of the DVD-RW. FIGS. 16A through 18B show features of power and time of recording the NRZI data signal using the recording waveform with the DC erase pattern of the prior art, and FIGS. 19A through 20 show improved features of recording the NRZI data signal using the recording waveform of the present invention.

Figure 16A:
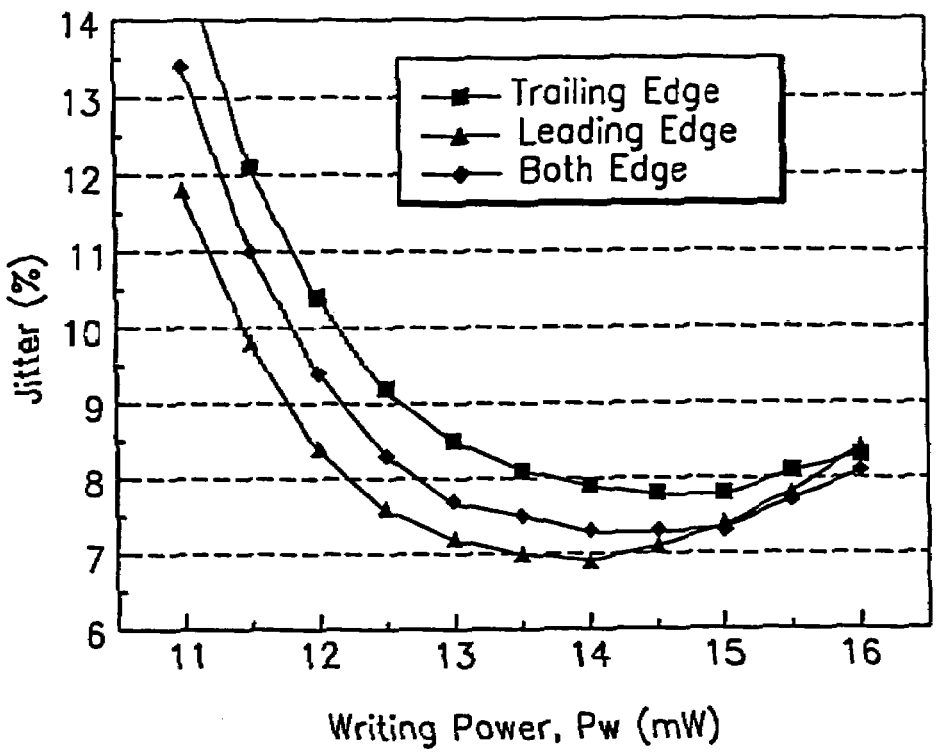
Figure 16B:
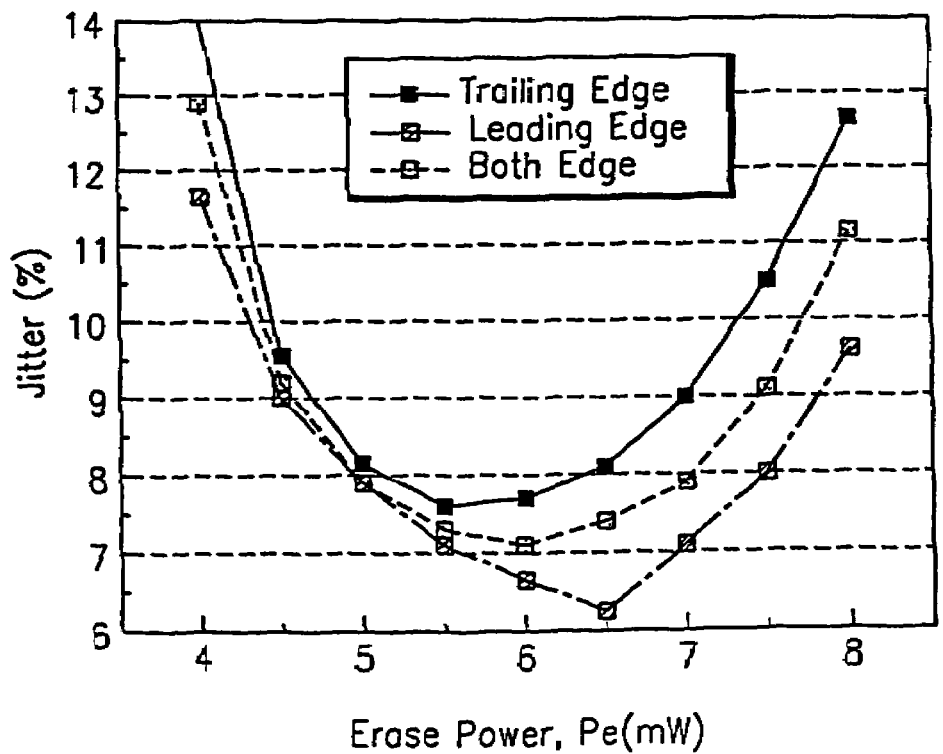
Figure 17A:
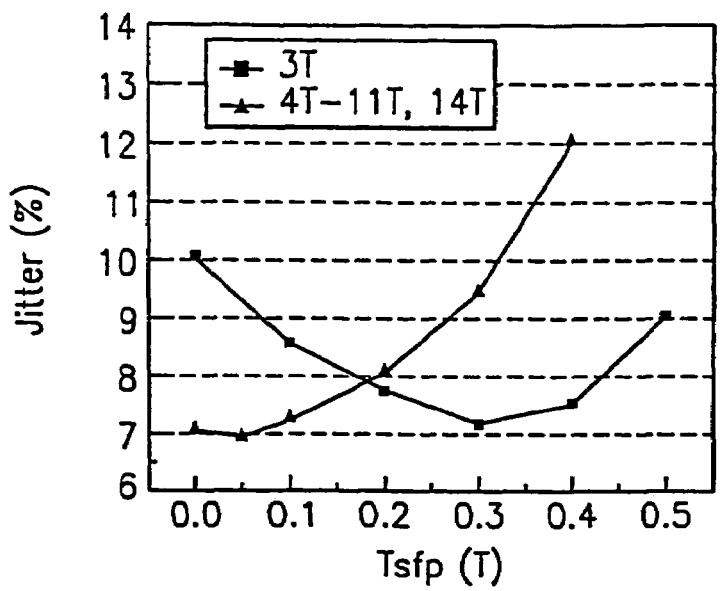
Figure 17B:
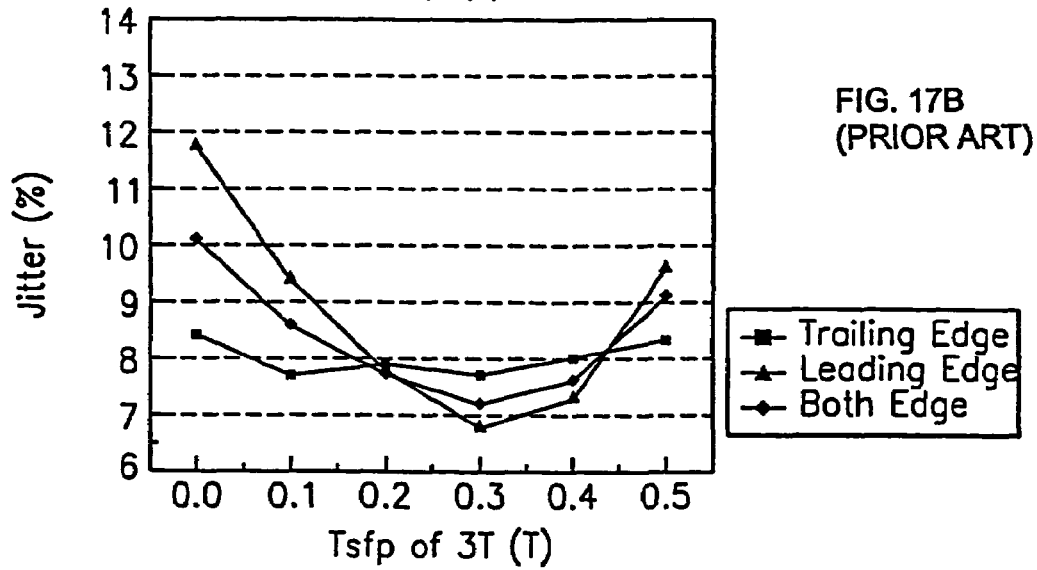
Figure 17C:
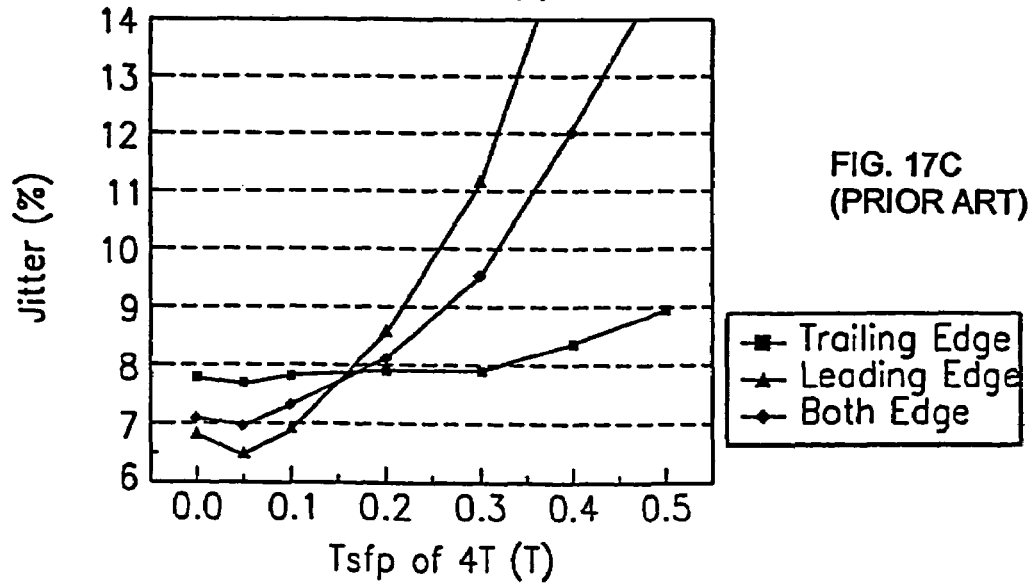
Figure 18A:
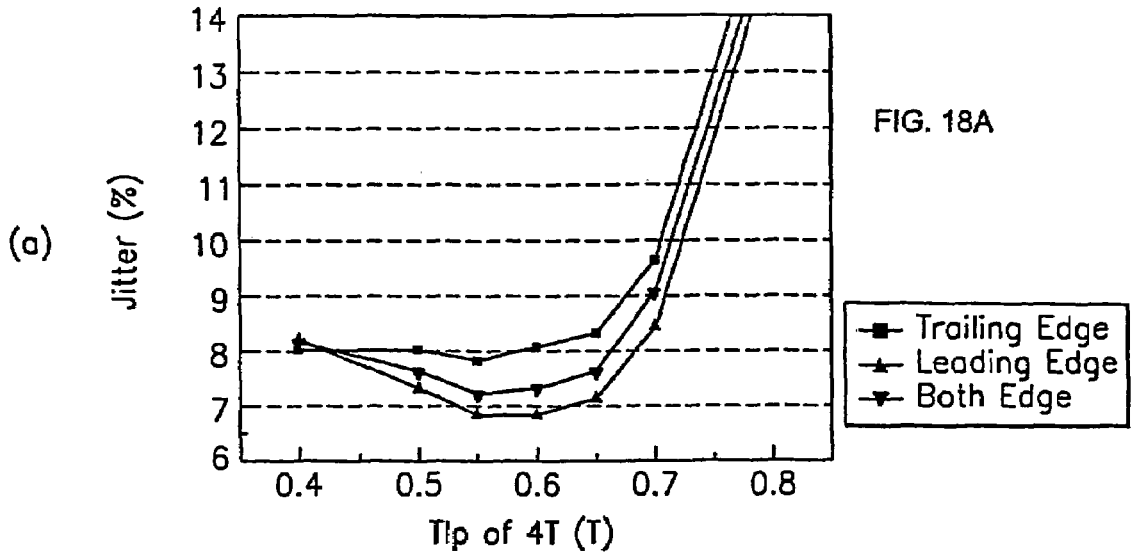
Figure 18B:
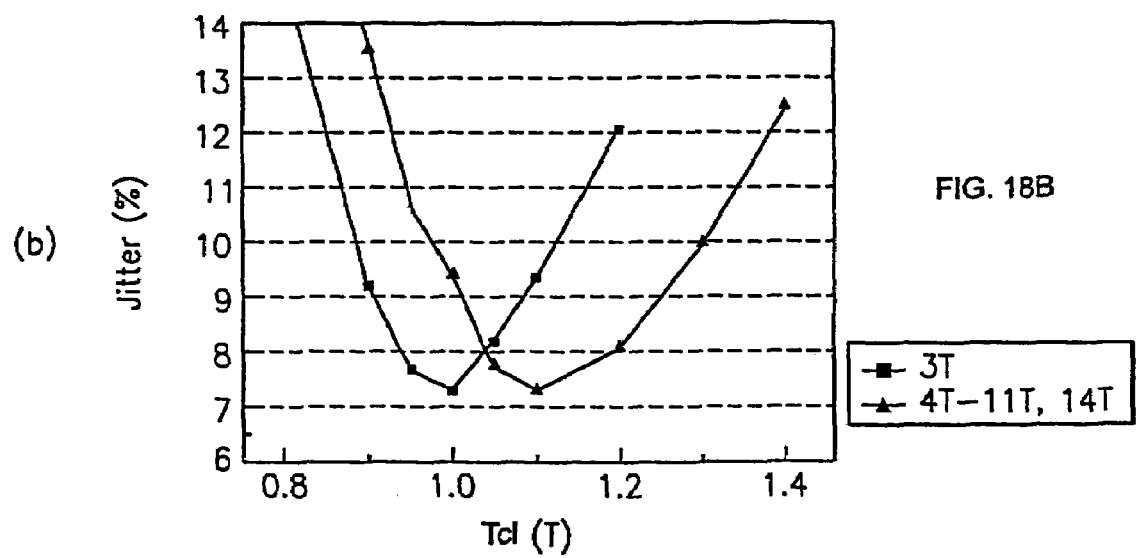

FIGS. 16A and 16B show jitter characteristics with respect to recording power and erase power, respectively, for the leading edge, trailing edge, and both edges of the mark in the prior art DC erase. Based on FIGS. 16A and 16B, 14.0 mW recording power and 6 mW erase power were selected.

FIGS. 17A through 18B show the measured results in the prior art DC erase. Referring to FIGS. 17A through 18B, the most preferable jitter characteristics are shown when Tsfp=0.3Ts and when Tsfp=0.05Ts. Tcl was good in 0.55Ts, and Tlp was good in 1.0T and 1.1Ts.

Based on the parameters experimentally obtained in this way, the mark was formed with the recording waveform having the four types of erase patterns described above, and the reproducing characteristics of the formed mark were measured as the following.

Figure 19B:
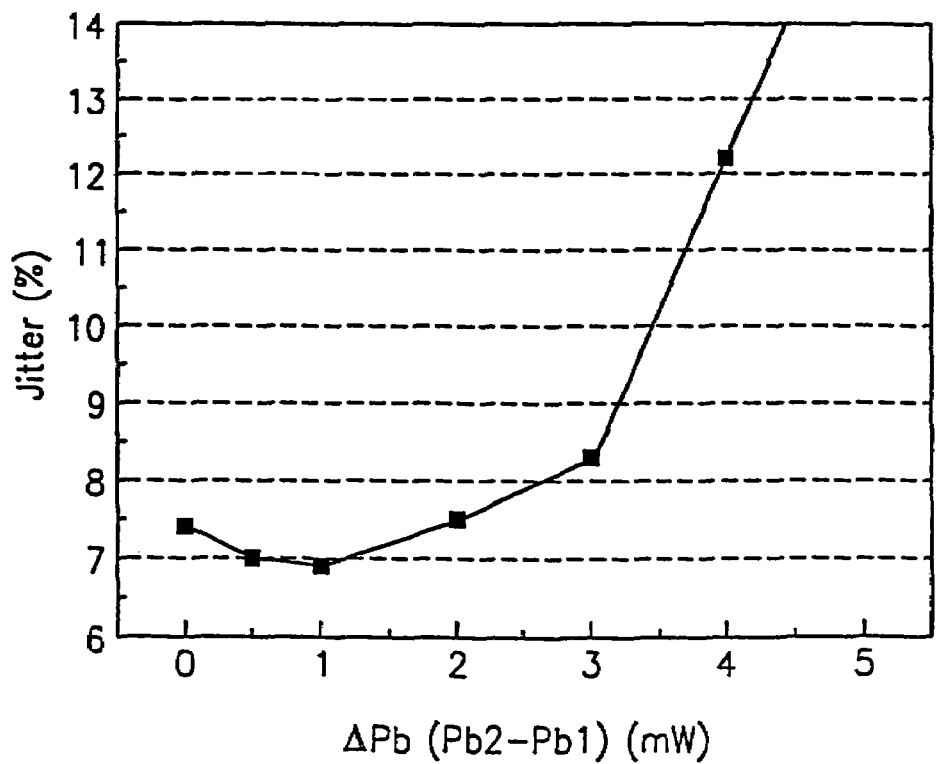

FIGS. 19A and 19B show the jitter characteristics of the four types shown in FIGS. 6B through 6E. Referring to FIG. 19A, it is shown that the LH type is the best among the four types. When the erase pattern formed with the erase multi-pulse according to the present invention is used in erasing the mark, the jitter characteristics of Pb(Pb2−Pb1) which is the difference between the high level and the low level of the erase multi-pulse is shown. Since the characteristics are suddenly degraded from 3 mW, 1 mW was selected as a condition for the repetitive recording/reproducing experiment.

FIG. 20 shows the jitter characteristics of the results of repetitive recording/reproducing the NRZI data signal using the recording pulse having the erase pattern according to the present invention. Referring to FIG. 20, it is easily understood that when the mark is erased using the erase multi-pulse according to the present invention, the result is good, especially in the repetitive recording characteristics aspect. However, the jitter characteristics were suddenly degraded from 2,000 times. Therefore, it is shown that the pulse erase method according to the present invention is advantageous up to 1,000 times repetitive recording that is guaranteed in the normal DVD-RW.

Meanwhile, the above experiments followed the DVD formats and therefore the EFM+ modulation method was used. However, if any of other modulation methods that are normally used, for example, the RLL(1, 7) method, the D(8-15) method, and the Dual modulation method, is used, the result will be the same.

A recording method according to another embodiment of the present invention based on the structure described above will now be explained.

Figure 21:
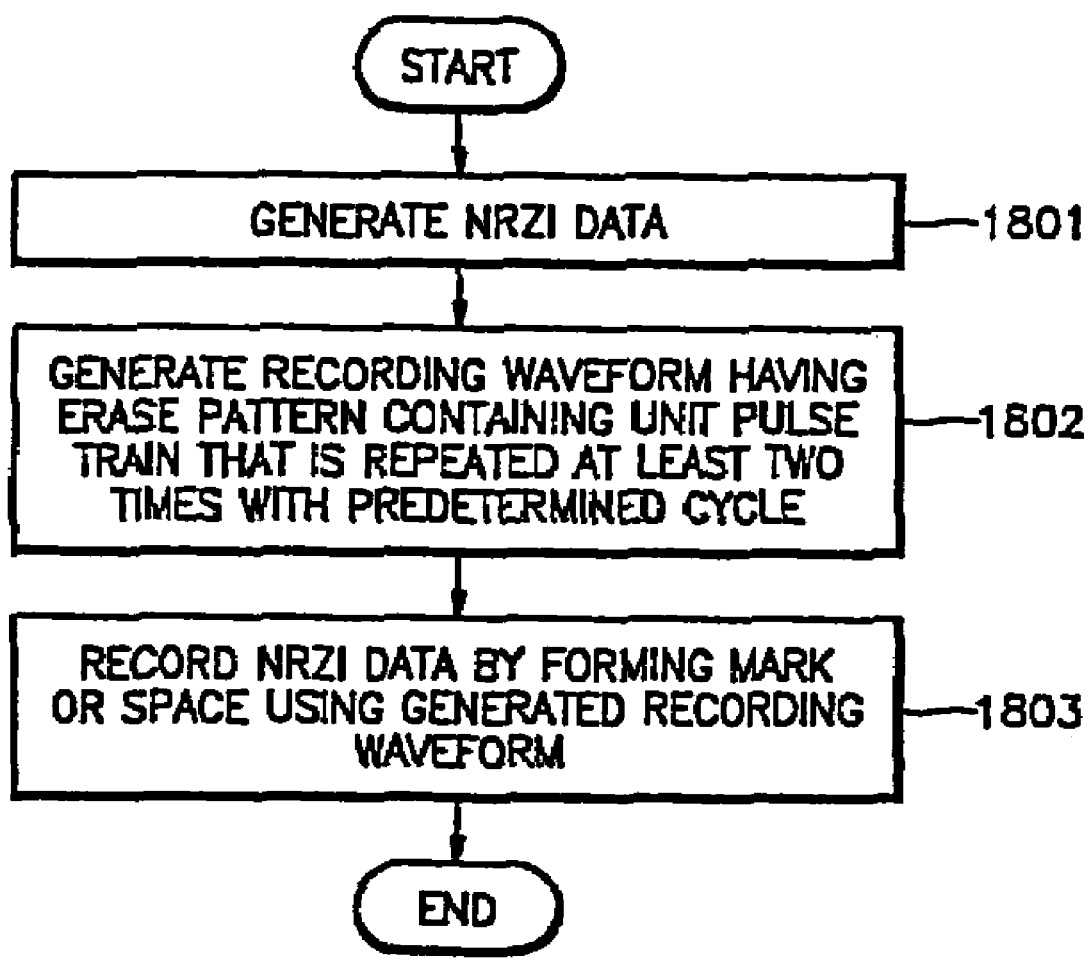
FIG. 21 is a flowchart showing a recording method according to another embodiment of the present invention.

FIG. 21 is a flowchart showing the recording method. Referring to FIG. 21, the recording apparatus receives data from the outside source, modulates the data, and generates the NRZI data signal in operation 1801. Then, the recording apparatus generates the recording waveform having the erase pattern containing the erase multi-pulse in operation 1802. Using the generated recording waveform, the mark or the space is formed on the optical disc 200 in operation 1803.

As described above, according the present invention, the method of and apparatus for recording data using the recording waveform prevents distortion of the shape of the mark occurring due to heat interference and heat accumulation when data is recorded, and improves the shape of the mark so that the characteristics of recording/reproducing of the data are improved.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. An apparatus for forming a first state and a second state alternatively and sequentially on an optical recording medium in response to input data having a first level and a second level less than the first level, respectively, in an optical recording apparatus, the apparatus comprising:
   a recording waveform generating unit generating a recording waveform which includes:
      a first multi-pulse corresponding to the first level of the input data and having first pulses alternating between a low first multi-pulse level and a high first multi-pulse level,
      a second multi-pulse preceding the first multi-pulse and corresponding to the second level of the input data, the second multi-pulse having second pulses alternating between a low second multi-pulse level and a high second multi-pulse level,
      a cooling pulse connecting another first multi-pulse preceding the second multi-pulse and which extends from a trailing one of the pulses of the another first multi-pulse to a leading one of the pulses of the second multi-pulse, the cooling pulse forming a portion of the first pulses of the another first multi-pulse and a portion of the second pulses,
      the leading one of the pulses of the second multi-pulse set to the low second multi-pulse level,
      a power level between an end of the second multi-pulse and a first one of the pulses of the first multi-pulse set to the high second multi-pulse level, and
      the high second multi-pulse level set between the low and high first multi-pulse levels.

2. The apparatus of claim 1, further comprising:
   a pickup unit generating light to form the first state and the second state on the optical recording medium in accordance with the first multi-pulse and the second multi-pulse of the recording waveform generated from the recording waveform generating unit.

3. The apparatus of claim 2, wherein the pickup unit comprises:

a laser device generating the light varying in accordance with the first multi-pulse and the second multi-pulse to form the first state and the second state on the optical recording medium.

4. The apparatus of claim 3, wherein the laser device has a voltage to generate the light, and the voltage varies according to the first multi-pulse during forming the first state and in accordance with the second multi-pulse during forming the second state.

5. The apparatus of claim 3, wherein the voltage is not a DC voltage.

6. The apparatus of claim 1, wherein the input data comprises NRZI data having a high potential and a low potential each representing one of the first level and the second level.

7. The apparatus of claim 1, wherein the first state is a mark, and the second state is a space.

8. The apparatus of claim 1, wherein the first multi-pulse is a recording pattern to form a mark, and the second multi-pulse is an erase pattern to form a space.

9. The apparatus of claim 1, wherein the cooling pulse has a level less than the low second multi-pulse level.

10. The apparatus of claim 1, wherein the high second multi-pulse level is less than the high first multi-pulse level.

11. The apparatus of claim 1, wherein the first pulses have a first duty cycle, and the second pulses a second duty cycle.

12. The apparatus of claim 11, wherein each second pulse comprises a high level and a low level, and the second duty cycle comprises:
a ratio of a duration time of the high level and another duration time of the low level in a range between 0.25T and 0.75T, where T is a cycle of a reference clock.

13. The apparatus of claim 1, further comprising:
a servo unit rotating the optical recording medium according to one of the first multi-pulse and the second multi-pulse during forming the first state and the second state.

14. The apparatus of claim 13, wherein the second multi-pulse comprises a starting pulse and an ending pulse, and the servo unit controls a rotation speed of the optical recording medium in accordance with one of a starting pulse and an ending pulse of the second multi-pulse.

15. The apparatus of claim 1, wherein the recording waveform generating unit detects information data representing a characteristic of the second multi-pulse.

16. The apparatus of claim 15, wherein the optical recording medium includes a wobble signal, and the recording waveform generating unit detects the information data from the wobble signal.

17. The apparatus of claim 15, further comprising:
a servo unit rotating the optical recording medium in accordance with the information data.

18. The apparatus of claim 15, further comprising: a laser device recording the information data on the optical recording medium.

19. The apparatus of claim 18, wherein the optical recording medium comprises a lead-in-area, and the information data is recorded in the lead-in-area of the optical recording medium.

20. The apparatus of claim 18, further comprising:
a servo unit receiving the information data read from the optical recording medium and rotating the optical recording medium at a speed corresponding to the received information data.

21. The apparatus of claim 18, further comprising:
a servo unit rotating the optical recording medium in a first speed, receiving the information data from the optical recording medium, and rotating the optical recording medium at a second speed according to the received information data.

* * * * *